US012730514B2

(12) United States Patent
Calder et al.

(10) Patent No.: US 12,730,514 B2
(45) Date of Patent: Sep. 8, 2026

(54) METHOD AND SYSTEM TO PROVIDE MULTISENSORY DIGITAL INTERACTION EXPERIENCES

(71) Applicant: LULULEMON ATHLETICA CANADA INC., Vancouver (CA)

(72) Inventors: Ellisa Kathleen Calder, Vancouver (CA); Timothy Ryan McGee, Vancouver (CA); Daniel Patrick Ryder, Vancouver (CA); Sarah Renee Parnes Rogowsky, Vancouver (CA); Piengpatou Clarissa Junchaya, Vancouver (CA); Charles Yust, Vancouver (CA); Tammy Baird, Vancouver (CA); Ho-Wei Hsu, Vancouver (CA); Antonello Crimi, Vancouver (CA); Hidekazu Saegusa, Vancouver (CA)

(73) Assignee: Lululemon Athletica Canada Inc., Vancouver (CA)

( * ) Notice: Subject to any disclaimer, the term of this patent is extended or adjusted under 35 U.S.C. 154(b) by 172 days.

(21) Appl. No.: 18/712,620

(22) PCT Filed: Nov. 24, 2022

(86) PCT No.: PCT/CA2022/051728
§ 371 (c)(1),
(2) Date: May 22, 2024

(87) PCT Pub. No.: WO2023/092229
PCT Pub. Date: Jun. 1, 2023

(65) Prior Publication Data

US 2025/0013307 A1 Jan. 9, 2025

Related U.S. Application Data

(60) Provisional application No. 63/283,357, filed on Nov. 26, 2021.

(51) Int. Cl.
*G06F 3/01* (2006.01)
*G06Q 30/0601* (2023.01)

(52) U.S. Cl.
CPC .............. *G06F 3/016* (2013.01); *G06F 3/011* (2013.01); *G06Q 30/0643* (2013.01)

(58) Field of Classification Search
CPC ...... G06F 3/016; G06F 3/011; G06Q 30/0643
See application file for complete search history.

(56) References Cited

U.S. PATENT DOCUMENTS 12,033,201 B2 7/2024 Loeb et al.
2013/0110482 A1* 5/2013 Ellens ..................... G06F 30/23 703/6
2016/0274662 A1 9/2016 Rimon et al.

FOREIGN PATENT DOCUMENTS

CN 104461006 A * 3/2015 ............. G06F 3/011

OTHER PUBLICATIONS

International Search Report and Written Opinion of International Application No. PCT/CA2022/051728 dated March 1, 2023.

* cited by examiner

*Primary Examiner* — Xin Sheng
(74) *Attorney, Agent, or Firm* — Norton Rose Fulbright Canada LLP; Thomas Sutherland

(57) ABSTRACT

Embodiments described herein relate to systems and methods for a multisensory digital interaction experience to create simulated in-person experiences of apparel and material, such as garments and fabric. The system generates digital output for an online web application or device hosted application. In one embodiment, the system provides the multisensory digital interaction experience that matches (Continued)

device capacity, experience context, and the best interaction type for the tactile representation values associated with manufactured apparel.

18 Claims, 20 Drawing Sheets

User Device 10
(equipped with video camera
to support augmented reality)

METHOD AND SYSTEM TO PROVIDE MULTISENSORY DIGITAL INTERACTION EXPERIENCES

CROSS REFERENCE TO RELATED APPLICATION

The present application claims the benefit of and priority to U.S. Provisional Application No. 63/283,357 entitled METHOD AND SYSTEM TO PROVIDE MULTISENSORY DIGITAL INTERACTION EXPERIENCES filed Nov. 26, 2021, the entire contents of which are hereby incorporated by reference.

FIELD

The present disclosure relates to methods and systems for electrical computers, digital processing, computer interfaces, apparel (e.g. garments, accessories, footwear), digital simulation, and multisensory digital interaction experiences.

INTRODUCTION

The human experience of apparel (e.g. fabric garments, footwear, accessories) is a complex interaction. Potential purchasers of an item of apparel use techniques to evaluate the item of apparel and gauge their desire to purchase that item. For example, a garment is evaluated based on such factors as its purpose (e.g., yoga, running, swimming), garment type (e.g., bra, legging, jacket), color, fit, and warmth. A garment is also evaluated based on less tangible qualities that enable the customer to estimate of how they will feel emotionally, physically, and psychologically when wearing the garment and whether they will be satisfied by a particular garment.

Customers or users who make apparel purchasing decisions through online retail experiences, where it is not possible to have in-person physical retail experiences such as touching the material, testing the stretch of the material, and fit on the body, have further challenges evaluating apparel.

Embodiments described herein relate to automated systems and methods that provide multisensory digital interaction experiences of manufactured apparel to users by processing contextual data, material or fabric data, and apparel data to calculate tactile representation values, determine a type of experience to generate, and to generate multisensory digital interaction experiences based on contextual metadata and tactile representation values. These generated interaction experiences provide a computer interface for a user to manipulate a digital simulation which receives tactile inputs and provides sensory output that simulates interaction with manufactured apparel.

Embodiments described herein relate to automated systems for processing contextual data, user data, material or fabric data, construction data, and other characteristics to determine the interaction type that best conveys a particular item of apparel to the user and providing a corresponding generated digital interaction to the user.

These generated interactions are responsive to user touch interactions to simulate physical or in-person experiences of apparel. The generated interaction types simulated include physical (e.g. in-person) interactions such as grasping fabric or other material, stretching fabric, manipulating the stiffness and/or thickness of fabric, stroking and feeling the motion of the garment in various contexts. In aspects of embodiments of embodiments, these interaction experiences are generated as executable instruction modules, interactive media files, interactive applications, and/or applets.

Embodiments described herein involve automated systems for calculating tactile representation values based on data related to a fabric or other material, and data related to determine the most effective interaction types to provide and to generate a specific multisensory digital interaction experience.

A user manipulating an interaction has a personal experience of a simulated characteristic of the item of apparel. For example, a touch interaction experience enables the user to have a sense of testing, touching, and feeling of a garment and provides additional techniques for customers to evaluate the garment or other type of apparel item.

Embodiments described herein involve automated systems for providing multisensory interaction types that factor customers preferred ways of experiencing apparel and activity profile.

SUMMARY

In an aspect, embodiments described herein provide systems and methods for a generated multisensory digital interactive experience with non-transitory memory storing data related to material and apparel construction to provide interaction experiences to users on a device connected to an online retail web application or with executable instructions installed on a user device. For example, the non-transitory memory can store data related to fabric and garment construction. In an aspect, embodiments described herein provide a multisensory digital interactive experience, also referred to as an interaction experience.

Embodiments described herein system for providing user access to a multisensory digital interaction experience to simulate physical interaction with manufactured apparel. The system has a user device having an interface to provide a multisensory digital interaction experience, wherein the user device connects to one or more output devices that provide sensory output that electronically simulates physical interaction with a manufactured item of apparel. The system has a hardware processor programmed with executable instructions for generating the multisensory digital interaction experience, wherein the hardware processor: receives input data comprising contextual experience data, material data, apparel construction data; calculates tactile representation values using the input data; determines an interaction type to generate based on the tactile representation values and at least one trained interaction type model; generates the multisensory digital interaction experience using the interaction type. The system has a non-transitory memory storing the at least one trained interaction type model, and data records defining the contextual experience data, the material data, and the apparel construction data. The user device connects with one or more input devices for capturing data defining interaction with the multisensory digital interaction experience to manipulate or control one or more aspects of the multisensory digital interaction experience, wherein the user device has network capacity for transmitting the data defining the interaction with the multisensory digital interaction experience, and device capacity metadata.

In some embodiments, the interaction experience type of the multisensory digital interaction experience comprises simulating at least one of grasping, scrunching, stretching, feeling thickness, smoothing, feeling apparel movement on hanger, feeling material movement on hanger, feeling apparel movement on flat surface, feeling material movement on flat surface, feeling apparel movement on body, feeling material movement on body, opacity of apparel on hanger, opacity of material on hanger, opacity of apparel on flat surface, opacity of material on flat surface, opacity of apparel on body, opacity of material on body, resilience of apparel, resilience of fabric, manipulating design detail of apparel, tightening design detail of apparel, loosening design detail of apparel, fastening design detail of apparel, unfastening design detail of apparel, manipulating aspect of material, waterproofness of apparel, waterproofness of material, wicking of apparel, wicking of fabric, moisture absorption of apparel, moisture absorption of material, the sound of apparel being manipulated, the sound of material being manipulated, the sound of apparel movement on body, the sound of material movement on body, the sound of apparel engaged in a specific activity, the sound of material engaged in a specific activity, folding of apparel, folding of material, unfolding of apparel, unfolding of fabric, feeling apparel movement on curved surface, feeling material movement on curved surface, opacity of apparel on curved surface, opacity of apparel on curved surface, scrunching, tilting of apparel in light, tilting of material in light, manipulation of apparel in different simulated environmental conditions, manipulation of material in different simulated environmental conditions, simulation of apparel engaged in specific activity, simulation of material engaged in specific activity, simulation of apparel motion engaged in specific movement of a portion of a body, simulation of apparel stretch engaged in specific movement of a portion of a body, simulation of apparel opacity engaged in specific movement of a portion of a body, smell of apparel, smell of material, movement of water on apparel surface, movement of water on material surface, movement of snow on apparel surface, movement of snow on material surface, movement of wind on apparel surface, movement of wind on material surface, simulating directional compliance of apparel, simulating directional compliance of a material, grip of apparel on a surface, grip of material on a surface, traction of apparel on a surface, traction of material on a surface, simulating UV exposure of apparel, simulating UV exposure of material, simulating transition between lighting conditions of apparel, simulating transition between lighting conditions of material, simulating apparel response to moisture, simulating material response to moisture, simulating apparel response to temperature, simulating material response to temperature, simulating warming of the apparel on the skin, simulating warming of the apparel on potions of the body, simulating warming of the apparel when engaged in a specific activity, simulating warming of the material on the skin, simulating warming of the material on potions of the body, simulating warming of the material when engaged in a specific activity, simulating cooling of the apparel on the skin, simulating cooling of the apparel on potions of the body, simulating cooling of the apparel when engaged in a specific activity, simulating cooling of the material on the skin, simulating cooling of the material on potions of the body, simulating cooling of the material when engaged in a specific activity.

In some embodiments, the multisensory digital interaction experience comprises the use of augmented reality to integrate one or more of a body part of the user and an environment of the user within the multisensory digital interaction experience.

In some embodiments, the multisensory digital interaction experience contains a interactive element that enables a user to engage with more than one multisensory digital interaction experiences.

In some embodiments, the hardware processor generates the multisensory digital interactive experience to receive inputs, provide outputs and update a display of the multisensory digital interaction experience.

In some embodiments, the wherein the manufactured item of apparel is at least one of a legging, shirt, bra, footwear, jacket, outerwear, swimwear, bag, accessory, pant, under garment, sweater, shorts, joggers, and sleepwear.

In some embodiments, the user device has one or more of an online retail web application and an application installed thereon to provide the sensory digital interaction experience.

In some embodiments, the one or more input devices of the user device comprise one or more sensors for capturing the interaction with the multisensory digital interaction experience.

In some embodiments, the hardware processor is programmed with the executable instructions to evaluate the input data using a pre-trained model stored in the non-transitory memory.

In some embodiments, the system has a data storage device with a repository of previously generated multisensory digital interaction experiences, wherein the hardware processor generates the multisensory digital interaction experience using the repository.

In some embodiments, the hardware processor is programmed with the executable instructions to evaluate previously generated multisensory digital interaction experiences against one or more of the context data, material data, apparel construction data, device capacity data, the tactile representation values, user preferences, the device capacity metadata and determine whether to regenerate, customize, or augment the multisensory digital interaction experience.

In some embodiments, the trained interaction type model is updated using machine learning.

In some embodiments, the user device further comprises one or more of a haptic glove, a haptic item of apparel, augmented reality glasses, virtual reality headsets.

In some embodiments, the user device further comprises a video camera and a display screen.

In some embodiments, the user device comprises a smart mirror.

In some embodiments, the user device comprises an immersive hardware device.

In some embodiments, the system has another hardware processor programmed with executable instructions for displaying information concerning manufactured items of apparel.

In some embodiments, the input data comprises structured data, unstructured data, metadata, text, numeric values, images, renderings based on images, video, audio, sensor data.

In some embodiments, the contextual experience data comprises one or more data and metadata related to one or more of specific contextual user data, user classification metadata, time, date, location, fabric feel profile, specific contextual retail activity, categories of retail activity, specific contextual activity profile data, specific contextual movement profile data, categories of activity profile data, categories of movement profile data, specific contextual multisensory digital interaction experience data, multisensory digital interaction experience metadata, specific feel state data, categories of feel state data, specific wellness data, categories of wellness data, specific contextual mood data, categories of mood data, user biometric data, categories of user biometric data, user wishlist, categories of user wishlists, user purchase history, categories of purchase history, navigational history, categories of navigational history, universal health scores based on user activity, and categories of universal health scores.

In some embodiments, the material data comprises one or more of material manufacture data, material depiction data, material classification data, material special property data.

In some embodiments, the material data comprises data for more than one material within the apparel construction.

In some embodiments, the apparel construction data comprises one or more of apparel elements data, apparel form and fit data, apparel classification data, apparel design based on sizing data, waistline data, band data, strap data, pocket data, loft data, draping data, decorative element data, apparel layer data, apparel pattern data, transformative element data, extender data, fastener data, apparel compression data, apparel venting data, apparel seam data, apparel bonding data, apparel coating data, apparel manufacturing process data, apparel air flow data.

In some embodiments, the hardware processor programmed with executable instructions updates the multisensory digital interaction experience by one or more of fully regenerating the multisensory digital interaction experience, partially regenerating the multisensory digital interaction experience, adding data to the multisensory digital interaction experience.

In some embodiments, the hardware processor programmed with executable instructions uses an aspect of one or more of the context data, the material data, the apparel data, to identify a specific aspect of the multisensory digital interaction experience to update when partially regenerating the multisensory digital interaction experience.

In some embodiments, the hardware processor programmed with executable instructions evaluates the device capacity to provide the multisensory digital interaction experience, applies the capacity of the user device as a criterion to evaluate one or more of the regenerating the multisensory digital interaction experience, the partially regenerating the multisensory digital interaction experience, the adding data to the multisensory digital interaction experience.

In some embodiments, the hardware processor programmed with executable instructions evaluates user preference metadata as a criterion for one or more of the regenerating the multisensory digital interaction experience, the partially regenerating the multisensory digital interaction experience, the adding data to the multisensory digital interaction experience.

In some embodiments, the multisensory digital interaction experience involves one or more physiological senses.

In some embodiments, the one or more physiological senses comprise touch, sight, sound, smell, and taste.

In some embodiments, the hardware processor programmed with executable instructions generates the multisensory digital interaction experience as a material based digital interaction experience that involves simulating touch of the material.

In some embodiments, the hardware processor programmed with executable instructions generates the material based digital interaction experience independent of construction of an item of apparel.

In some embodiments, the hardware processor programmed with executable instructions generates the material based digital interaction experience for an item of apparel with different types of materials for the item of apparel.

Embodiments described herein provide a system for generating and providing a multisensory digital interaction experience to simulate physical interaction with manufactured apparel. The system has a hardware processor programmed with executable instructions for generating a multisensory digital interaction experience for one or more output devices that provide sensory output that electronically simulates physical interaction with a manufactured item of apparel. The hardware processor: receives input data comprising contextual experience data, material data, apparel construction data; calculates tactile representation values using the input data; determines an interaction type to generate based on the tactile representation values and at least one trained interaction type model; generates the multisensory digital interaction experience using the interaction type. The system has a non-transitory memory storing the at least one trained interaction type model, and data records defining the contextual experience data, the material data, and the apparel construction data.

Embodiments described herein provide a computer implemented method for generating a multisensory digital interaction experience to electronically simulate physical interaction with manufactured apparel. The method involves: computing, using a hardware processor, tactile representation values using contextual data, material data, and apparel construction data, by the hardware processor: receiving input data identifying qualities associated with an experience context, qualities associated with material for an item of manufactured apparel, and qualities associated with apparel construction for the item of manufactured apparel; processing the input data to calculate tactile representation values; determining one or more interaction types associated with the tactile representation values based on an interaction type model mapping the tactile representation values to a plurality of interaction types; generating, using the hardware processor, a multisensory digital interaction experience simulating physical interaction with the item of manufactured apparel based on the tactile representation values and the one or more interaction types; providing the multisensory digital interaction experience simulating physical interaction with the item of manufactured apparel at an interface of a user device.

Embodiments described herein relate to a multisensory digital interaction experience to simulate physical interaction with manufactured apparel wherein the multisensory digital interaction experience is generated from calculated values based on contextual data, metadata, material or fabric data, and garment construction data. In an aspect, embodiments described herein involve an associated trained model of interaction types, associated with the specific instances of multisensory digital interaction experience, and used to evaluate tactile representation values.

In an embodiment, the multisensory digital interaction experiences involve simulating physical (e.g. in-person) apparel experiences for different types of apparel. For example, the multisensory digital interaction experiences can involve one or more of the following grasping, stretching, feeling thickness, feeling apparel, feeling garment movement on hanger, feeling garment movement on flat surface, feeling garment movement on body, opacity of garment on flat surface, opacity of garment on body, resilience of apparel material or fabric, manipulating design detail of apparel, waterproofness of item, wicking of garment, moisture absorption of garment, the sound of apparel item being manipulated, the sound of garment movement on body, and so on.

In an embodiment, the multisensory digital interaction experience involve the use of augmented reality to integrate the users body part and/or environment within the multisensory digital interaction experience. In an aspect, the multisensory digital interaction experience contains interactive elements that enable a user to engage with more than one multisensory digital interaction experience types.

In an embodiment, the multisensory digital interaction experience is generated as a module with executable instructions to receive inputs, provide outputs and display the multisensory digital interaction experience. In an aspect, the multisensory digital experience is stored in a repository.

The multisensory digital interaction experience provides an experience for different types of apparel (e.g. manufactured garment) such as, for example, a legging, shirt, bra, footwear, jacket, outerwear, swimwear, bag, accessory, pant, under garment, sweater, shorts, joggers, sleepwear, footwear, and so on.

Example embodiments provide a system and method for a user to access a multisensory digital interaction experience to simulate physical interaction with manufactured apparel. The system has an interface, a hardware processor programmed with executable instructions for displaying information concerning manufactured garments and a hardware processor programmed with executable instructions for generating a multisensory digital interaction experience receives input data including contextual experience data, material or fabric data, construction data, and calculating tactile representation values. In one aspect, the hardware processor programmed with the executable code determines the best interaction types to generate based on the tactile representation values. The system includes a trained interaction type model, data records concerning the experience context, material or fabric, and apparel construction. A user device has a hardware processor coupled with one or more sensors for capturing interaction with the multisensory digital interaction experience, an interface and network capacity. The user device enables the user to engage with the generated interaction experience.

In an aspect, the executable instructions for displaying information concerning manufactured apparel provide or populate an online retail web application; in one aspect, an application is installed on the user device. In one embodiment, the user device has executable instructions to program the hardware processor to evaluate the input data using a pre-trained model. In one embodiment, the system has a repository of previously generated multisensory digital interaction experiences. In one aspect, the system includes executable instructions to automatically evaluate previously generated multisensory digital interaction experiences against tactile representation values and determine whether to regenerate, customize, or augment the multisensory digital interaction experience. In one embodiment, the trained interaction type model is updated based on machine learning.

In one embodiment, the user device of the system includes a haptic glove, a haptic garment, augmented reality glasses, and/or virtual reality headsets. In one embodiment, to support augmented reality multisensory digital interaction experiences, the user device has a video camera.

In an embodiment, there is provided a method for generating a multisensory digital interaction experience to simulate physical interaction with manufactured apparel. This method involves computing tactile representation values by using a hardware processor to process contextual data, material or fabric data, and construction data. The method involves receiving input data identifying qualities associated with an experience context, qualities associated with a fabric or other material, and qualities associated with apparel construction, and this input data is processed by the hardware processor to calculate tactile representation values. The tactile representation values are evaluated by an interaction type model to determine one or more interaction types associated with the tactile representation values, this interaction type being best suited to represent the item(s) of apparel. The tactile representation values are mapped to the interaction type to generate the multisensory digital interaction experience.

The data inputs can involve structured data, unstructured data, metadata, text, numeric values, images, renderings based on images, video, audio, sensor data.

The contextual data includes data that pertains to the context for the interaction experience. For example, in some embodiments, the contextual dataset contains data identifying qualities such as specific contextual user data, user classification metadata, fabric feel profile, specific contextual retail activity, categories of retail activity, specific contextual activity/movement profile data, categories of activity/movement profile data, specific contextual multisensory digital interaction experience data, multisensory digital interaction experience metadata, specific feel state data, categories of feel state data, specific wellness data, categories of wellness data, specific contextual mood data, categories of mood data, and so on.

The material and/or fabric data includes data that pertains to the material and/or fabric contained in the manufactured apparel. For example, in some embodiments, the material or fabric dataset includes data identifying qualities such as fabric manufacture data, fabric depiction data, fabric classification data, fabric special property data, and so on. In some embodiments, identifying qualities associated with a fabric comprises receiving data for more than one fabric within the apparel construction. The garment construction data includes data that pertains to the garment construction of the manufactured garment. For example, in some embodiments, the apparel construction dataset includes data identifying qualities such as apparel elements data, apparel form and fit data, apparel classification data, apparel design based on sizing data, waistline data, band data, strap data, pocket data, loft data, draping data, decorative element data, and so on.

In one embodiment, the interaction type model is a trained model. In one embodiment, the interaction type model is updated through machine learning. In one embodiment, a generated multisensory digital interaction experience is stored in a repository. In some embodiments, a request for a matching interaction experience includes data defining experience context data, material or fabric data, apparel data, and this data is criteria to determine matching multisensory digital interaction experience stored in the repository. In one embodiment, the tactile representation values are the criteria to determine matching multisensory digital interaction experiences. In one embodiment, the method includes instructions for partially regenerating the multisensory digital interaction experience. In one embodiment, the method includes instructions for customizing and augmenting a multisensory digital interaction experience. In one embodiment, device capacity is a criterion to determine if a multisensory digital interaction experience is regenerated.

In one embodiment of the method, the interaction type involves simulating at least one of grasping, stretching, feeling thickness, feeling apparel, feeling garment movement on hanger, feeling garment movement on flat surface, feeling garment movement on body, opacity of garment on hanger, opacity of garment on flat surface, opacity of garment on body, resilience of apparel material or fabric, manipulating design detail of apparel, waterproofness of apparel, wicking of garment, moisture absorption of garment, the sound of garment being manipulated, the sound of garment movement on body, folding of garment, and so on.

In one embodiment, there is a method for providing a multisensory digital interaction experience that simulates a physical (e.g. in-person) apparel experience to the user. This method involves receiving device metadata to determine device capacity for interaction types, receiving user engagement data providing navigational context data. Based on this data, one or more matching multisensory digital interaction experience is determined and provided. In one embodiment, the matching multisensory digital interaction experience is generated and stored.

In one aspect, the user engagement data includes the user indicating one or more of a product, a fabric or material, a color, a navigation narrative, a product category, an activity category, feel state, or mood. In one aspect, the user engagement providing context data is generated through user navigation, user search, user purchase history, user navigation history, chat communication. In one embodiment, the matching criteria prioritizes one or more of user preferences, user purchase history, product category, current promotions or offers for a user.

In one embodiment, the method for providing to a user a multisensory digital interaction experience includes determining if customization of the matching multisensory digital interaction experience is needed and adding customization. In one embodiment, customization does not require regenerating the interaction experience. In one aspect of this embodiment, the customization includes additions such as background audio, color palette, resolution, added messages, added warnings, personalized splash screens, personalized offers, added links, and so on.

In one embodiment, a system for generating a multisensory digital interaction experience to simulate physical interaction with manufactured apparel is provided. This system includes a hardware processor programmed with executable instructions in non-transitory memory to receive data input associated with an experience context, fabric, and apparel construction; generate tactile representation values; determine interaction types that match the generated representation values; map the representation values to the interaction type; and generate at least one multisensory digital interaction experience. In some embodiments, data records define context, fabric, and apparel construction; an interaction type model are part of the system. In one embodiment the system further includes an interaction repository. In one embodiment of the system, the interaction type model is pre-trained.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

Embodiments of the disclosure will now be described in conjunction with the accompanying drawings of which.

DETAILED DESCRIPTION

Figure 1:
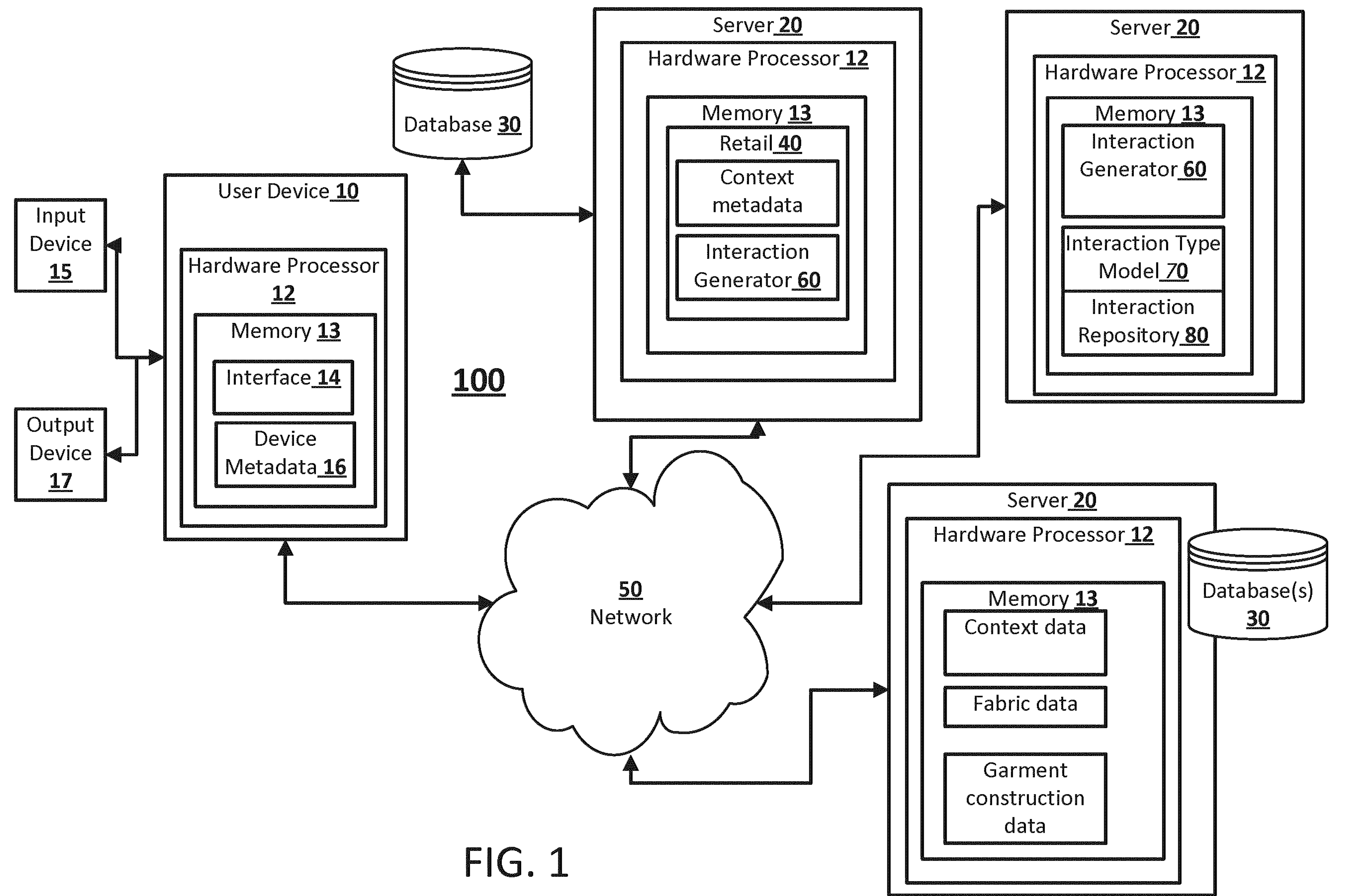
FIG. 1 shows an example system architecture for generating multisensory digital interaction experiences for users based on experience context data, material or fabric data, and garment construction data, according to embodiments described herein.

Embodiments relate to methods and systems with non-transitory memory storing data records for experience context, material or fabric characteristics, apparel construction characteristics; and a hardware processor having executable instructions to provide a generated multisensory digital interaction experience simulating physical interaction with apparel by computing tactile representation values based on the experience context, material or fabric characteristics, apparel construction characteristics, and so on.

Embodiments described herein relate to apparel such as garments, accessories, and footwear. An item of apparel can be manufactured or constructed using different materials, such as fabric and other non-fabric materials (e.g. rubber, wood) and notions (e.g. buttons, zippers). Embodiments described herein relate to digital interaction experiences with apparel such as tactile based interaction experiences relating to fabric or material based interactions that electronically simulate physical (e.g. in-person) interaction with fabric or material of one or more item(s) of apparel. The interaction experiences can be apparel item agnostic and/or for items with the same or similar construction using different material or fabric.

Embodiments described herein can provide improved methods and systems for electronically simulating physical interaction with manufactured apparel through a multisensory digital interaction experience. A simulated physical interaction can refer to an in-person interaction with an item, or simulating physical presence with the item. The simulated physical interaction can involve simulating interactions involving different physiological senses, such as touch, sight, sound, smell, and taste. Accordingly simulated physical interactions can be tactile, visual and/or audio interactions, for example. While various embodiments of the disclosure are described below, the disclosure is not limited to these embodiments, and variations of these embodiments may well fall within the scope of the disclosure which is to be limited only by the appended claims.

Generally, according to embodiments of the disclosure, there are described methods and systems for determining an appropriate type of interaction experience for apparel, and generating a multisensory digital interaction experience to electronically simulate physical interaction with apparel (e.g. touch interactions, visual interactions, audio interactions). The multisensory digital interaction experience can be generated by a hardware processor from tactile representation values for a manufactured item of apparel. The tactile representation values can be computed by the hardware processor based on contextual data, material data, and apparel construction data. Embodiments described herein relate to different kinds of sensory experiences. For example, in embodiments, the sensory experience provides a tactile simulation of the user's experience of a material, an item of apparel warming and/or cooling the skin. In other embodiments, the sensory experience can simulate movement of the item of apparel and materials. As a further example, the sensory experience can simulate the sound of the material. Other example sensory experiences are referred to herein.

In some embodiments, the multisensory digital interaction experience involves a multisensory digital interaction experience that is associated with an interaction experience type. Example interaction types involve simulations of apparel interactions such as grasping, stretching, feeling thickness, feeling garment movement on hanger, feeling garment movement on flat surface, feeling garment movement on body, opacity of garment on hanger, opacity of garment on flat surface, opacity of garment on body, resilience of garment fabric, manipulating design detail of garment, waterproofness of garment, wicking of garment, moisture absorption of garment, the sound of garment being manipulated, the sound of garment movement on body, folding of garment, and so on. For example, different interaction types involve simulating at least one of grasping, scrunching, stretching, feeling thickness, smoothing of material for an item of apparel. In some embodiments, an item of apparel can be a garment manufactured using fabric, and the different interaction types can involve feeling garment movement on hanger, feeling fabric movement on hanger, feeling garment movement on flat surface, feeling fabric movement on flat surface, feeling garment movement on body, feeling fabric movement on body, opacity of garment on hanger, opacity of fabric on hanger, opacity of garment on flat surface, opacity of fabric on flat surface, opacity of garment on body, opacity of fabric on body, and so on. In some example embodiments, different interaction types for apparel involve resilience of an item of apparel, resilience of material or fabric, manipulating design detail of an item of apparel, tightening design detail of an item of apparel, loosening design detail of an item of apparel, fastening design detail of an item of apparel, unfastening design detail of an item of apparel, manipulating aspect of material or fabric, waterproofness of an item of apparel, waterproofness of material or fabric, wicking of an item of apparel, wicking of material or fabric, moisture absorption of an item of apparel, moisture absorption of material or fabric, the sound of an item of apparel being manipulated, the sound of material or fabric being manipulated, the sound of apparel movement on body, the sound of material or fabric movement on body, the sound of an item of apparel engaged in a specific activity, the sound of material or fabric engaged in a specific activity, folding of an item of apparel, folding of material or fabric, unfolding of an item of apparel, unfolding of material or fabric, feeling apparel movement on curved surface, feeling material or fabric movement on curved surface, opacity of an item of apparel on curved surface, opacity of an item of apparel on curved surface, scrunching, tilting of an item of apparel in light, tilting of material or fabric in light, manipulation of garment in different simulated environmental conditions, manipulation of material; in different simulated environmental conditions, simulation of an item of apparel engaged in specific activity, simulation of material or fabric engaged in specific activity, simulation of apparel motion engaged in specific movement of a portion of a body, simulation of apparel stretch engaged in specific movement of a portion of a body, simulation of apparel opacity engaged in specific movement of a portion of a body, smell of apparel, smell of material or fabric, movement of water on apparel surface, movement of water on fabric surface, movement of snow on apparel surface, movement of snow on fabric surface, movement of wind on apparel surface, movement of wind on fabric surface, simulating directional compliance of an item of apparel, simulating directional compliance of a fabric, grip of apparel on a surface, grip of material on a surface, traction of apparel on a surface, traction of material on a surface, simulating UV exposure of an item of apparel, simulating UV exposure of fabric, simulating transition between lighting conditions of an item of apparel, simulating transition between lighting conditions of fabric, simulating apparel response to moisture, simulating fabric response to moisture, simulating apparel response to temperature, simulating fabric response to temperature, simulating warming of the apparel on the skin, simulating warming of the apparel on potions of the body, simulating warming of the apparel when engaged in a specific activity, simulating warming of the material on the skin, simulating warming of the material on potions of the body, simulating warming of the material when engaged in a specific activity, simulating cooling of the apparel on the skin, simulating cooling of the apparel on potions of the body, simulating cooling of the apparel when engaged in a specific activity, simulating cooling of the material on the skin, simulating cooling of the material on potions of the body, simulating cooling of the material when engaged in a specific activity, and so on. In some embodiments, within an interaction type, specific techniques are used within the interaction which are best able to convey an aspect associated with that interaction type. For example, different camera angles, distances, fabric manipulations, background surfaces, and other aspects may be used to generate media content related to a feeling thickness interaction type when fabric thinness is highlighted rather than fabric thickness.

In one embodiment, to determine the interaction type to provide to the user, inputs of data and metadata related to the user device capacity, user preferences, the experience context, fabric, and apparel construction are evaluated by a hardware processor to calculate tactile representation values. These tactile representation values are inputs to determine the specific interaction types to generate and inputs into the process of generating the multisensory digital interaction experience. In embodiments, there is a trained interaction type model. In some embodiments, a hardware processor trains the interaction type model.

The term fabric as used herein can refer to different types of materials for construction or manufacture of different types of items of apparel. Accordingly, the term fabric as used herein can refer to material, including non-fabric material and notions. For example, footwear can have soles of a type of a material, and a body of a type of fabric, and other non-fabric details such as eyelets or zippers. The term apparel as used herein can refer to different garments, footwear, and accessories that can be constructed or manufactured using different types of material or fabric.

The system 100 calculates tactile representation values. The multisensory digital interaction experience can be a tactile based digital interaction experience. The term tactile representation values can refer to values or metrics that indicate tactile (or touch) qualities or characteristics of a fabric or a material, one or more apparel items, or portions thereof. The tactile representation values can be agnostic of a specific garment construction in some embodiments. For example, the calculated tactile representation values can be a set of numeric values that indicate tactile or touch qualities or characteristics. In one embodiment, the tactile representation values include one or more unstructured data items that indicate tactile or touch qualities or characteristics. In some embodiments, a tactile representation value can be associated with a fabric or a material, associated with one or more apparel item, but agnostic of a specific garment construction.

The system 100 calculates tactile representation values based on the input values received or accessed by the system 100, such as garment classification, or feel state data. In one embodiment, the inputs provide a numerical representation of fabric qualities including all or a subset of fabric category, fabric color, fabric type, fabric feel, fabric weight, and fabric coatings for each of the fabric elements within the garment as well as garment measurements, garment fit metrics, garment category, garment feel, garment color combinations. These numeric values are then used by system 100 to calculate a composite value representing the garment as tactile representation values.

In one embodiment, one of the inputs used to calculate the tactile representation values is video, and/or a series of images, of the garment undergoing predetermined interactions and one of the output values relates to this visual input. In one embodiment, one of the inputs used to calculate the tactile representation values is audio of the garment undergoing predetermined interactions and one of the output values relates to this audio.

For example, certain types of fabric movement and response matter more to a user when evaluating a garment's suitability for a specific activity. For example, when evaluating a legging garment, stretching the fabric and feeling the smoothness of the fabric on the body may be effective interaction types. When evaluating a jacket type garment, interacting with thickness and loft through pinching the fabric and seeing the fabric response and simulating a surface response to water exposure may be more effective. These characteristics can be modeled by tactile representation values.

The tactile representation values may represent different factors, such as activity, intended feel state, garment type, fabric qualities, garment construction details. In one embodiment, the tactile representation values provide data for generating multiple colors, sizes designs, or versions of a product. In one embodiment, a subset of tactile representation values can be used to generate the interaction experience.

Turning to FIG. 1, there is shown an embodiment of an interaction experience system 100 that may implement operations of the methods described herein. Interaction system 100 has hardware servers 20, databases 30 stored on non-transitory memory, a network 50, and user devices 10. Servers 20 have hardware processors 12 that are communicatively coupled to databases 30 stored on the non-transitory memory and are operable to access data stored on databases 30. Servers 20 are further communicatively coupled to user devices 10 via network 50 (such as the Internet). Thus, data may be transferred between servers 20 and user devices 10 by transmitting the data using network 50. The user devices 10 include non-transitory computer readable storage medium storing instructions to configure one or more hardware processors 12 to provide an interface 14 for collecting data, and exchanging data and commands with other components of the system 100. The user devices 10 have one or more network interfaces to communicate with the network 50 and exchange data with other components of the system 100. The servers 20 may also have a network interface to communicate with the network 50 and exchange data with other components of the system 100.

A number of users of interaction system 100 may use user devices 10 to exchange data and commands with servers 20 in manners described in further detail below. For simplicity of illustration, only one user device 10 is shown in FIG. 1, however, multisensory digital interaction experience system 100 can include multiple user devices 10, or even a single user device 10. The user devices 10 may be the same or different types of devices. The interaction system 100 is not limited to a particular configuration and different combinations of components can be used for different embodiments. Furthermore, while interaction system 100 shows three servers 20 and two databases 30 as an illustrative example, interaction system 100 extends to different numbers of servers 20 and databases 30 (such as a single server communicatively coupled to a single database). The servers 20 can be the same or different types of devices.

The user device 10 has at least one hardware processor 12, a data storage device 13 (including volatile memory or non-volatile memory or other data storage elements or a combination thereof), and at least one communication or network interface 15. The user device 10 components may be connected in various ways including directly coupled or indirectly coupled via a network 15. The user device 10 is configured to carry out the operations of methods described herein.

Each hardware processor 12 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof. Memory 13 may include a suitable combination of any type of computer memory that is located either internally or externally.

Each network interface 15 enables computing device 10 to communicate with other components, to exchange data with other components, to access and connect to network resources, to serve applications, and perform other computing applications by connecting to a network 50 (or multiple networks) capable of carrying data. The communication or network interface 15 can enable user device 10 to interconnect with one or more input devices, such as a keyboard, mouse, camera, touch screen and a microphone, or with one or more output devices such as a display screen and a speaker.

The memory 13 can store device metadata 16 which can include available metadata for factors such as memory, processor speed, touch screen, resolution, camera, video camera, processor, device location, haptic input/output devices, augmented reality glasses, virtual reality headsets. The system 100 can determine device capacity for interaction types by evaluating the device metadata 16, for example.

According to some embodiments, user device 10 is a mobile device such as a smartphone, although in other embodiments user device 10 may be any other suitable device that may be operated and interfaced with by a user. For example, user device 10 may comprise a laptop, a personal computer, an interactive kiosk device, immersive hardware device, smart mirror or a tablet device. An immersive hardware device can be a device or tool that creates immersive experiences that include digital elements that feel real to the user. A smart mirror can include a display device that also functions as a mirror, with embedded cameras to capture video or image data of a user. User device 10, may include multiple types of user devices and may include a combination of devices such as smart phones, tablet devices, within system 100.

Figure 2:
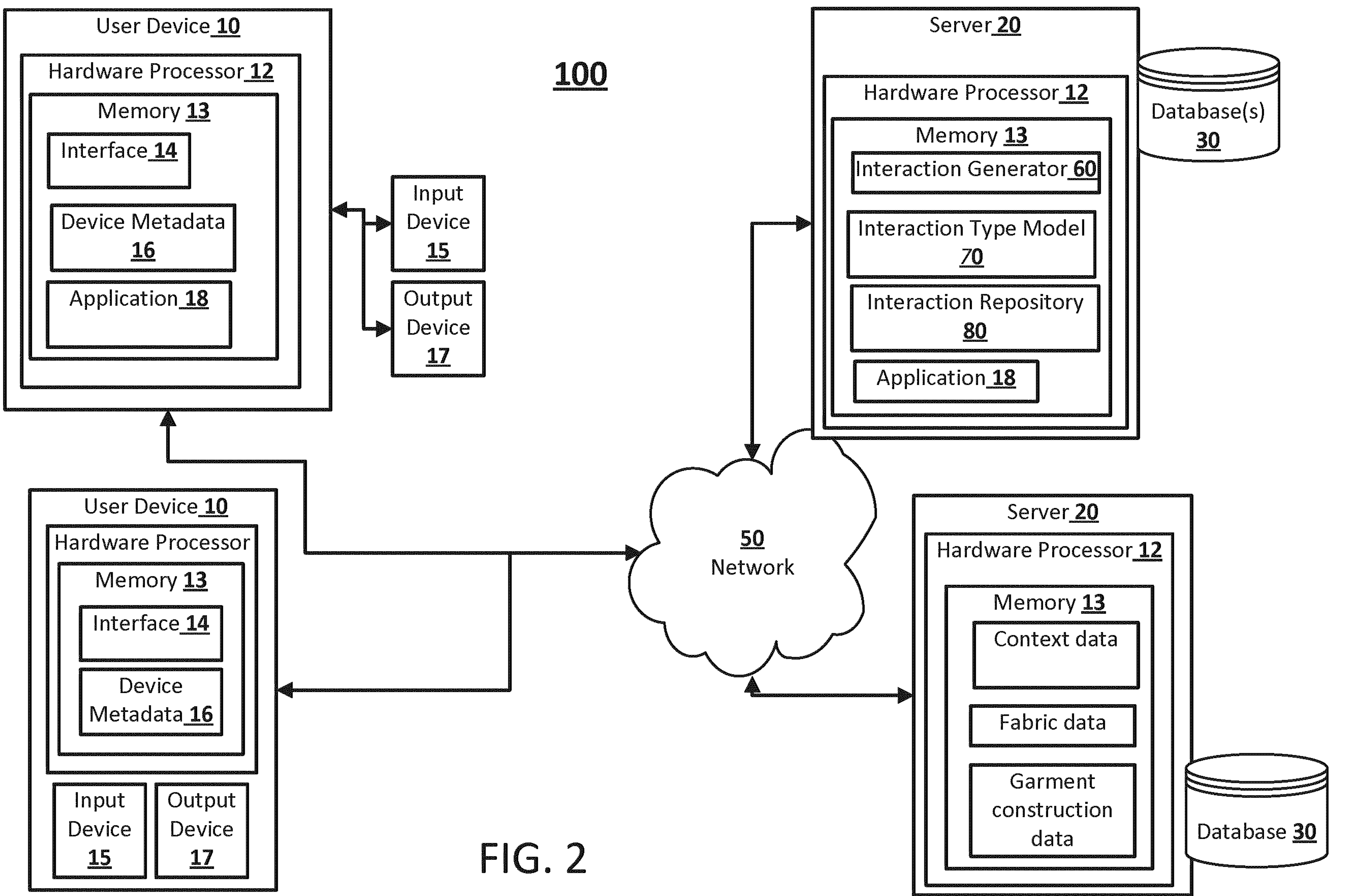
FIG. 2 shows an example system architecture for generating multisensory digital interaction experiences for users, according to embodiments described herein.
Figure 3:
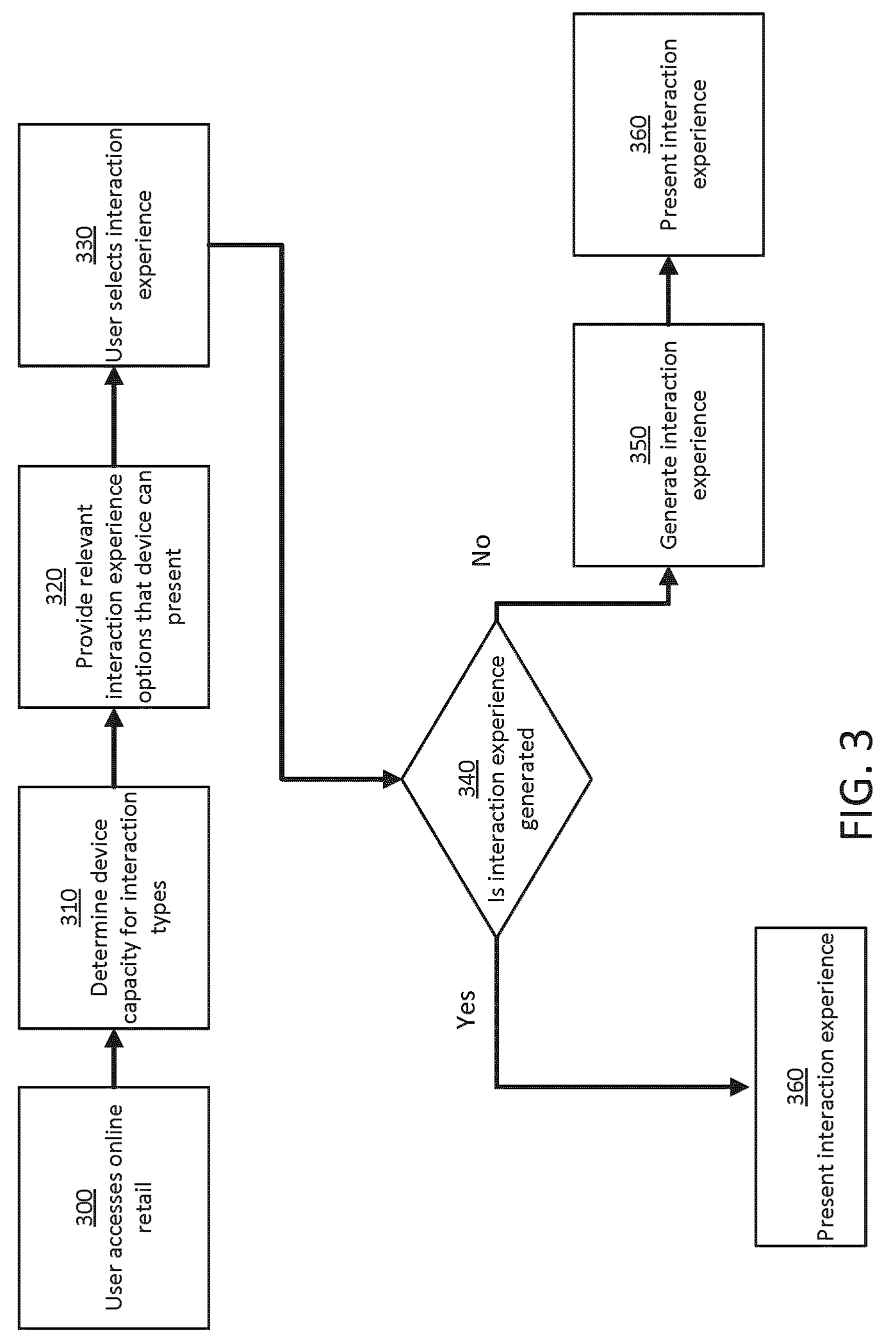
FIG. 3 shows an example method of providing a user with a multisensory digital interaction experience, according to embodiments described herein.

In FIG. 1 the example server architecture includes a server 20 with Retail 40 providing a retail web application. In other example architectures, similar functionality is provided by application 18 (FIG. 2). System 100 can be implemented using different architectures and configurations of hardware components. Executable instructions or code components such as Interaction Generator 60, Interaction Type Model 70, and Interaction Repository 80 may be installed on more than one server 20 within system 100. In some example architectures, Interaction Generator 60 may be installed on user device 10.

The server 20 has at least one hardware processor 12, a data storage device 13 (including volatile memory or non-volatile memory or other data storage elements or a combination thereof), and at least one communication or network interface. The server 20 components may be connected in various ways including directly coupled or indirectly coupled via a network 15. The server 20 is configured to carry out the operations of methods described herein.

User device 10 includes input and output capacity (via network interface 15 or I/O interface), a hardware processor 12, and computer-readable medium or memory 13 such as non-transitory computer memory storing computer program code.

The user device 10 may be a smart exercise device, or a component within a connected smart exercise system. Example types of smart exercise devices include smart mirror device, smart treadmill device, smart stationary bicycle device, smart home gym device, smart weight device, smart weightlifting device, smart bicycle device, smart exercise mat device, smart rower device, smart elliptical device, smart vertical climber, smart swim machine, smart boxing gym, smart boxing bag, smart boxing dummy, smart grappling dummy, smart dance studio, smart dance floor, smart dance barre, smart balance board, smart slide board, smart spin board, smart ski trainer, smart trampoline, or smart vibration platform. Additional smart devices that can be used in such a system include a connected audio music system, a connected lighting system. User in such systems may also input data and/or receive interaction experiences through different devices such as a camera, video camera, heart rate monitor, breathing monitor, a blood glucose monitor, an oximeter, an electronic implant, an EEG, a brain-computer interface, an accelerometer, a gyroscope, an inertial sensor, a GPS, a microphone type sensor, a gesture sensor, a hologram projection system, an autostereoscopic projection system, virtual reality headset, an augmented reality headset, mixed reality devices, virtual reality devices, an augmented reality device, a metaverse headset, a haptic glove, a game controller, a haptic garment, which may or may not be integrated in other devices. A single device may contain input device 15 and output device 17 functionality, a simple example of this would be a connected headset with integrated microphone.

Input device 15 may input data using a touch screen type sensor such as a resistive film touch panel sensor, capacitive touch panel sensor, surface capacitive touch panel sensors, projected capacitive touch panel sensors, surface acoustic wave (SAWN) sensors, infrared optical imaging touch panel sensors, electromagnetic induction touch panel sensor or the like.

User device 10 includes input and output capacity (via network interface 14 or I/O interface), a hardware processor 12, and computer-readable medium or memory 13 such as non-transitory computer memory storing computer program code. Input device 15 may be integrated within user device 10 or connected in various ways including directly coupled or indirectly coupled via a network 50. The input device can perform verifications and scans. For example, the input device can include (or couple to) one or more sensors that can measure user touch, movement, gestures, location, heartrate, eye movement, voice, relating to a user engagement with an interaction experience. A hardware processor 12 can receive input data from the sensors and inputs. Similarly, output device 17 may be integrated within user device 10 or connected in various ways including directly coupled or indirectly coupled via a network 50. The output device 17 can activate, trigger, or present one or more interaction experiences that simulate physical interaction with apparel, and can also trigger components that enhance the simulation. For example, output device 17 can activate or trigger audio associated with an interaction experience at a speaker device. As another example, output device 17 can present a visual component associated with an interaction experience at a display device. As a further example, output device 17 can provide a virtual reality headset experience to enable a virtual experience type interaction experience. Output device 17 may comprise a haptic actuator, voice coil actuator, electrostatic actuator or similar means of outputting movement, vibration, or the like.

The communication or network interface 14 can enable user device 10 to interconnect with one or more input devices, such as a keyboard, mouse, camera, touch screen, sensors and a microphone, or with one or more output devices such as a display screen and a speaker.

In some embodiments, the function of databases 30 may be implemented by servers 20 with non-transitory storage devices or memory. In other words, servers 20 may store the user data located on databases 30 within internal memory and may additionally perform any of the processing of data described herein. However, in the embodiment of FIG. 1, servers 20 are configured to remotely access the contents of databases 30, or store data on databases 30, when required.

Turning to FIG. 2, there is shown another embodiment of a user device 10 where the application 18 includes executable instructions displaying information concerning manufactured garments. In some embodiments application 18 may be provided on server 20 and remotely accessed by user device 10.

The interaction system 100 receives requests to generate multisensory digital interaction experiences for apparel, and in conjunction with the interaction generator 60, and in some embodiments interaction type model 70, and/or interaction repository 80 evaluates the type of interaction to generate the multisensory digital interaction experience. The interaction system 100 generates the multisensory digital interaction experience to simulate physical interaction with different types of items of apparel. For example, the multisensory digital interaction experience can be apparel item agnostic (e.g. specific item of apparel may be unknown or undecided, not dependent on a specific item of apparel). As another example, the multisensory digital interaction experience can be for different constructions of apparel items (e.g. different items of apparel can be constructed using different designs or methods but using similar material or fabric). As a further example, the multisensory digital interaction experience can be for different materials or fabrics, or the multisensory digital interaction experience can be generated for the same type of apparel item construction with different fabrics or materials, for example. Different types of digital interaction experiences can be generated based on characteristics of the item of apparel or the material.

In some embodiments, the multisensory digital interaction experience is generated as executable instructions stored within retail 40 or application 18. In some embodiments the multisensory digital interaction experience is streamed to user device 10 through network 50.

The interaction system 100 has non-transitory memory storing data records, context data, material data, construction data, and additional metadata received from a plurality of channels, at servers 20 and databases 30. For example, the data records for can involve a wide range of data related to context, material or fabric, construction, types of apparel, and device metadata. The data involves structured data, unstructured data, metadata, text, numeric values, images, renderings based on images, video, audio, sensor data, and so on.

For example, the contextual data includes data that pertains to the context for interaction experience. For example, in embodiments, contextual data contains data identifying qualities such as specific contextual user data, user classification metadata, contextual apparel data, material or fabric feel profile, specific contextual retail activity, categories of retail activity, specific contextual activity/movement profile data, categories of activity/movement profile data, specific contextual multisensory digital interaction experience data, multisensory digital interaction experience metadata, specific feel state data, categories of feel state data, specific wellness data, categories of wellness data, specific contextual mood data, categories of mood data, and so on.

The material or fabric data includes data that pertains to the material or fabric contained in the manufactured garment or other item of apparel. In embodiments, material or fabric data contains data identifying qualities such as material manufacture data, material depiction data, material classification data, material special property data. In some embodiments, identifying qualities associated with a fabric includes receiving data for more than one fabric within the garment construction. The construction data includes data that pertains to the construction of the manufactured garment or other item of apparel. In embodiments, the construction data contains data identifying qualities such as apparel elements data, form and fit data, apparel classification data, apparel design based on sizing data, waistline data, band data, strap data, pocket data, loft data, draping data, decorative element data, and so on.

The system 100 provides user device 10 access to a multisensory digital interaction experience to simulate physical interaction with manufactured apparel. The system 100 can simulate the material and fabric of apparel, as an example interaction action experience. User device 10 has an interface 14 to provide a multisensory digital interaction experience. The user device 10 connects to one or more output devices 17 that can provide sensory output to electronically simulate physical interaction with manufactured items of apparel. User device 10 has a hardware processor 12 programmed with executable instructions for generating the multisensory digital interaction experience. The hardware processor 12 receives input data such as contextual experience data, material data, apparel construction data.

The hardware processor 12 calculates tactile representation values using the input data. The hardware processor 12 determines an interaction type to generate based on the tactile representation values and at least one trained interaction type model. The hardware processor 12 generates the multisensory digital interaction experience using the interaction type. A non-transitory memory 13 stores the at least one trained interaction type model, and data records defining the contextual experience data, the material data, and the apparel construction data. In some embodiments, the trained interaction type model is updated using machine learning.

The user device connects 10 with one or more input devices 15 for capturing data defining interaction with the multisensory digital interaction experience to manipulate or control one or more aspects of the multisensory digital interaction experience. The user device 10 has network capacity for transmitting the data defining the interaction with the multisensory digital interaction experience, and device capacity metadata.

The interaction experience type of the multisensory digital interaction experience can involve simulating senses. For example, the experience can simulate touch of the material or fabric for the apparel item. The experience can be touch and visual multisensory digital interaction experience, touch and audio multisensory digital interaction experience, and combinations thereof. The multisensory digital interaction experience involves one or more physiological senses. The physiological senses can be touch, sight, sound, smell, and taste.

Additional examples include: grasping, scrunching, stretching, feeling thickness, smoothing, feeling apparel movement on hanger, feeling material movement on hanger, feeling apparel movement on flat surface, feeling material movement on flat surface, feeling apparel movement on body, feeling material movement on body, opacity of apparel on hanger, opacity of material on hanger, opacity of apparel on flat surface, opacity of flat surface, opacity of apparel on body, opacity of material on body, resilience of garment, resilience of fabric, manipulating design detail of apparel, tightening design detail of apparel, loosening design detail of apparel, fastening design detail of apparel, unfastening design detail of apparel, manipulating aspect of material, waterproofness of garment, waterproofness of material, wicking of apparel, wicking of fabric, moisture absorption of apparel, moisture absorption of material, the sound of apparel being manipulated, the sound of material being manipulated, the sound of apparel movement on body, the sound of material movement on body, the sound of apparel engaged in a specific activity, the sound of material engaged in a specific activity, folding of apparel, folding of material, unfolding of apparel, unfolding of fabric, feeling apparel movement on curved surface, feeling material movement on curved surface, opacity of apparel on curved surface, opacity of apparel on curved surface, scrunching, tilting of apparel in light, tilting of material in light, manipulation of apparel in different simulated environmental conditions, manipulation of material in different simulated environmental conditions, simulation of apparel engaged in specific activity, simulation of material engaged in specific activity, simulation of apparel motion engaged in specific movement of a portion of a body, simulation of apparel stretch engaged in specific movement of a portion of a body, simulation of apparel opacity engaged in specific movement of a portion of a body, smell of apparel, smell of material, movement of water on apparel surface, movement of water on material surface, movement of snow on apparel surface, movement of snow on material surface, movement of wind on apparel surface, movement of wind on material surface, simulating directional compliance of apparel, simulating directional compliance of a material, grip of apparel on a surface, grip of material on a surface, traction of apparel on a surface, traction of material on a surface, simulating UV exposure of apparel, simulating UV exposure of material, simulating transition between lighting conditions of apparel, simulating transition between lighting conditions of material, simulating apparel response to moisture, simulating material response to moisture, simulating apparel response to temperature, simulating material response to temperature, simulating warming of the apparel on the skin, simulating warming of the apparel on potions of the body, simulating warming of the apparel when engaged in a specific activity, simulating warming of the material on the skin, simulating warming of the material on potions of the body, simulating warming of the material when engaged in a specific activity, simulating cooling of the apparel on the skin, simulating cooling of the apparel on potions of the body, simulating cooling of the apparel when engaged in a specific activity, simulating cooling of the material on the skin, simulating cooling of the material on potions of the body, simulating cooling of the material when engaged in a specific activity.

In some embodiments, the multisensory digital interaction experience involves the use of augmented reality (e.g. by output devices 17) to integrate one or more of a body part of the user and an environment of the user within the multisensory digital interaction experience. In some embodiments, the multisensory digital interaction experience contains a interactive element (e.g. input device 15) that enables the user device 10 to engage with more than one multisensory digital interaction experiences.

In some embodiments, the hardware processor 12 generates the multisensory digital interactive experience to receive inputs from input device 15, provide outputs using output device 17. In some embodiments, the hardware processor 12 updates a display of the multisensory digital interaction experience using a display screen or touch display of immersive hardware, as examples of output device 17. The input devices 15 coupled to the user device 10 can have one or more sensors for capturing the interaction with the multisensory digital interaction experience. In some embodiments, the user device 10 has (or connects to) one or more of a haptic glove, a haptic garment, augmented reality glasses, virtual reality headsets. In some embodiments, the user device 10 has a video camera and a display screen as further examples of input devices 15 and output devices 17. In some embodiments, the user device 10 is (or connects to) a smart mirror. Accordingly, the user device 10 can be an immersive hardware device. In some embodiments, the system 100 uses the hardware processor 12 for displaying information concerning manufactured items of apparel.

The input devices 15 can capture different types of input data for processing, such as contextual experience data, material data, and apparel construction data. The hardware processor 12 can evaluate the input data using a pre-trained model stored in the non-transitory memory. The input data can be structured data, unstructured data, metadata, text, numeric values, images, renderings based on images, video, audio, sensor data. The contextual experience data can be data and metadata related to one or more of specific contextual user data, user classification metadata, time, date, location, fabric feel profile, specific contextual retail activity, categories of retail activity, specific contextual activity profile data, specific contextual movement profile data, categories of activity profile data, categories of movement profile data, specific contextual multisensory digital interaction experience data, multisensory digital interaction experience metadata, specific feel state data, categories of feel state data, specific wellness data, categories of wellness data, specific contextual mood data, categories of mood data, user biometric data, categories of user biometric data, user wishlist, categories of user wishlists, user purchase history, categories of purchase history, navigational history, categories of navigational history, universal health scores based on user activity, and categories of universal health scores. The material data can be material manufacture data, material depiction data, material classification data, material special property data. The material data can be data for more than one material within the apparel construction. Examples of apparel construction data are apparel elements data, apparel form and fit data, apparel classification data, apparel design based on sizing data, waistline data, band data, strap data, pocket data, loft data, draping data, decorative element data, apparel layer data, apparel pattern data, transformative element data, extender data, fastener data, apparel compression data, apparel venting data, apparel seam data, apparel bonding data, apparel coating data, apparel manufacturing process data, apparel air flow data.

The system 100 can be used for different types of manufactured items of apparel, such as leggings, shirts, bras, footwear, jackets, outerwear, swimwear, bags, accessories, pants, under garments, sweaters, shorts, joggers, sleepwear, and so on. The different types of items of apparel can be constructed or manufactured using different designs, methods, and materials. In some embodiments, the user device has one or more of an online retail web application for apparel and an application installed thereon to provide the sensory digital interaction experience for the apparel offered by the online retail web application.

In some embodiments, the data storage device 30 has a repository of previously generated multisensory digital interaction experiences. The hardware processor 12 generates the multisensory digital interaction experience using the repository. In some embodiments, the hardware processor 12 can evaluate previously generated multisensory digital interaction experiences against one or more of the context data, material data, apparel construction data, device capacity data, the tactile representation values, user preferences, the device capacity metadata and determine whether to regenerate, customize, or augment the multisensory digital interaction experience.

The hardware processor 12 can update the multisensory digital interaction experience by one or more of fully regenerating the multisensory digital interaction experience, partially regenerating the multisensory digital interaction experience, adding data to the multisensory digital interaction experience. In some embodiments, the hardware processor 12 uses an aspect of one or more of the context data, the material data, the apparel data, to identify a specific aspect of the multisensory digital interaction experience to update when partially regenerating the multisensory digital interaction experience. In some embodiments, the hardware processor 12 evaluates the device capacity to provide the multisensory digital interaction experience, applies the capacity of the user device as a criterion to evaluate one or more of the regenerating the multisensory digital interaction experience, the partially regenerating the multisensory digital interaction experience, the adding data to the multisensory digital interaction experience. In some embodiments, the hardware processor 12 evaluates user preference metadata as a criterion for one or more of the regenerating the multisensory digital interaction experience, the partially regenerating the multisensory digital interaction experience, the adding data to the multisensory digital interaction experience.

As an illustrative example, the hardware processor 12 can generate the multisensory digital interaction experience as a material or fabric based digital interaction experience that involves simulating touch interactions, for example. The system 100 can generate the material or fabric based digital interaction experience independent (i.e. not dependent on, agnostic) of a specific type of item of apparel. In some embodiments, the hardware processor 12 generates the material based digital interaction experience for an item of apparel with different types of materials for the item of apparel. The item can be of the same construction but using different types of fabrics or materials, for example.

Methods are shown generally in FIGS. 3-6 and 14-15 which show example flow diagrams of example steps that may be taken to provide and generate a multisensory digital interaction experience. As the skilled person would recognize, the steps shown in FIGS. 3-6 and 14-15 are exemplary in nature, and the order of the steps may be changed, and steps may be omitted and/or added without departing from the scope of the disclosure.

There will now be described a method of generating and providing multisensory digital interaction experiences for a user based on their navigational context, device capacity, and preferences, and providing the interaction experience via an interface 14. An example method is shown generally in FIG. 3 which shows a flow diagram of the steps that may be taken to provide a multisensory digital interaction experience.

The process for the purposes of this example, begins when a user accesses online retail application at 300. In one embodiment, this includes accessing an interface to display information concerning manufactured garments or other items of apparel, for example retail 40, with the user device 10 and interface 14, optionally providing user credentials. In embodiments, step 300 includes providing additional metadata related to the user, language context, device capacity, navigational activity, searches, and user preferences. At 310, the system 100 determines device capacity for interaction types, evaluating device metadata 16 and other available metadata for factors such as memory, processor speed, touch screen, resolution, camera, video camera, processor, device location, haptic input/output devices, augmented reality glasses, virtual reality headsets.

At 320, the system 100 provides the relevant interaction experience options that the device can display and may provide these options to the user through the interface (e.g. interface 14 of user device 10). In some embodiments, the interface displays stories, images, and navigational paths selected to highlight the multisensory digital interaction experiences which the user's device 10 can display, or which reflect user preferences or other aspects of the metadata concerning the user's navigational history. In some embodiments, the relevant interactions are determined by combining device capacity with other metadata such as geo-location, current promotions, availability of merchandise in users preferred size and/or color. At 330, the system 100 receives a selected an interaction experience. In some embodiments, this is by receiving input data indicating a selected link at interface 14. In some embodiments, other navigational tools are used by the interface 14 to lead the user to the provided multisensory digital interaction experience or experiences. At 340, system 100 (or server 20) uses interaction repository 80 to store generated interaction experiences. In some embodiments, at 320, the system 100 excludes potential interaction experiences that are not available in repository 80. At 350, the system 100 generates the interaction experience based on data concerning context, material, and apparel construction.

There will now be described a method of generating and providing multisensory digital interaction experiences for a user based on their navigational context, device capacity, and preferences, and providing the interaction experience via an interface (e.g. interface 14 of user device 10). The method is shown generally in FIG. 4 which shows a flow diagram of the steps that may be taken to generate a multisensory digital interaction experience.

Figure 4:
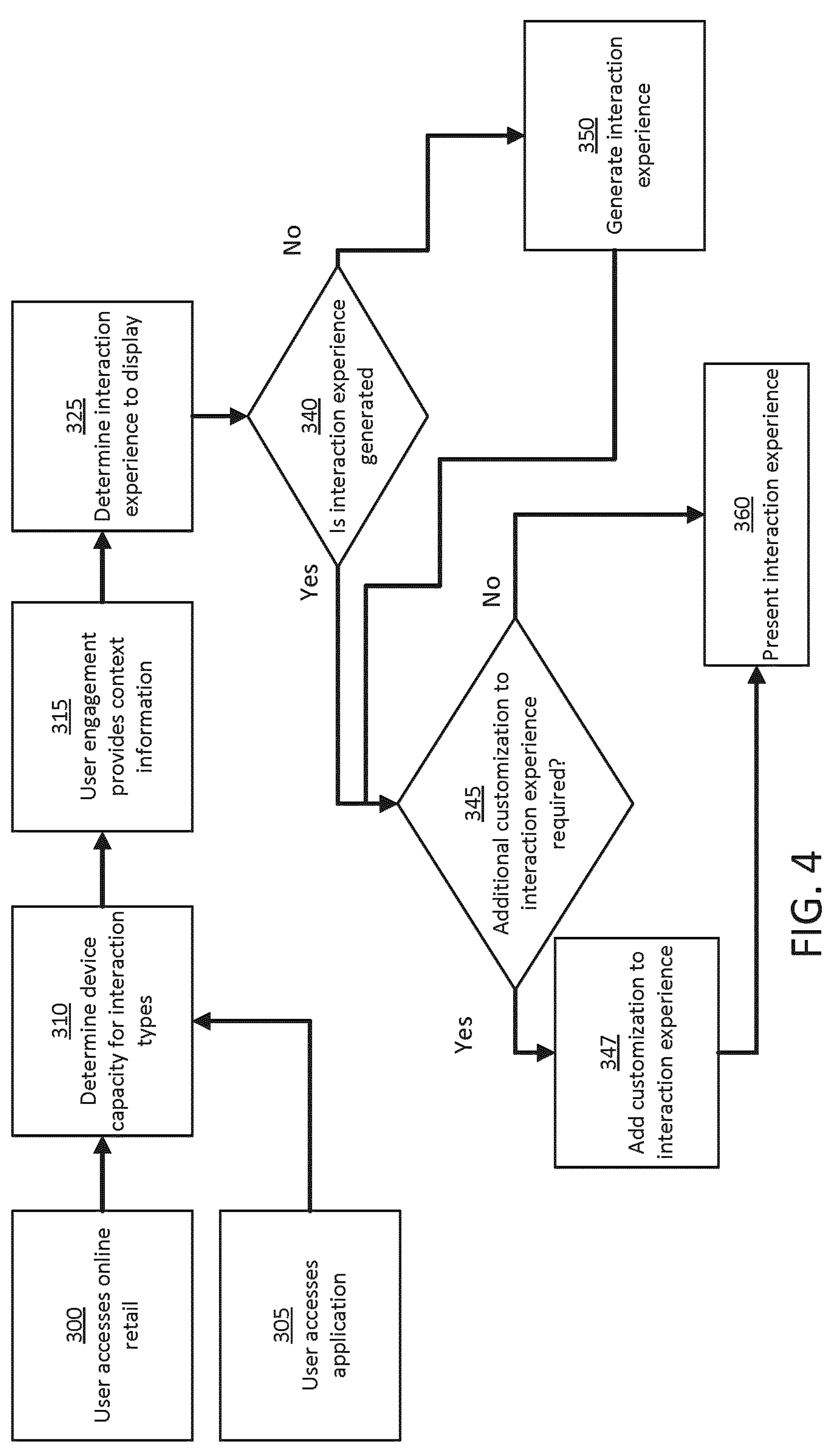
FIG. 4 shows another example method of providing a user with a multisensory digital interaction experience, according to embodiments described herein.

FIG. 4, illustrates a process flow example embodiment in which, at 300, system 100 provides access to online retail application for apparel, where the retail application can be a web application 40 or user accesses application 305 where the application 18 is installed on user device 10. See FIG. 3 for parallel step 310.

In FIG. 4. at 315, server 100 captures user engagement data to provide context information. In embodiments, this includes such activities as searches, following navigational flows, indicating mood, indicating feel state preferences, user chat content, and other user activity data. At 325, the server 100 determines one or more interaction experiences to display by combining data from user engagement with other available metadata, such as device capacity 310 to select one or more interaction experience to present to the user. In some embodiments there are interaction experiences for a fabric and/or material, fabric type and/or material type, in some embodiments for an apparel item, and in some embodiments for a combination. Example items of apparel include footwear, shoes, and clothing.

At 340, system 100 uses interaction repository 80 to store generated interaction experiences. In some embodiments, at 325, system 100 excludes potential interaction experiences that are not available in repository 80. At 350, system 100 generates the interaction experience based on data concerning context, material or fabric, and apparel construction.

In some embodiments, at 350, system 100 generates the interaction experience using executable instructions to partially regenerate the interaction experience. In some embodiments, system 100 changes values associated with certain aspects of the product version, color, or size of the product trigger. In one embodiment, at 350, system 100 partially regenerates the file adjusting a specified value or values.

In embodiments, at 345, system 100 determines whether additional customization to an interaction experience is required. If the system determines that additional customization to an interaction experience is required, at 347, the system 100 adds customization to the interaction experience to provide executable instructions that allow customizations of such aspects as background audio, color palette, resolution, added messages or warnings, personalized splash screens, personalized offers, added links, and similar elements without regenerating the interaction experience itself. In one aspect of the embodiment, at 360, the system presents interaction experience which can include presenting customizations added represented at 347.

Figure 5:
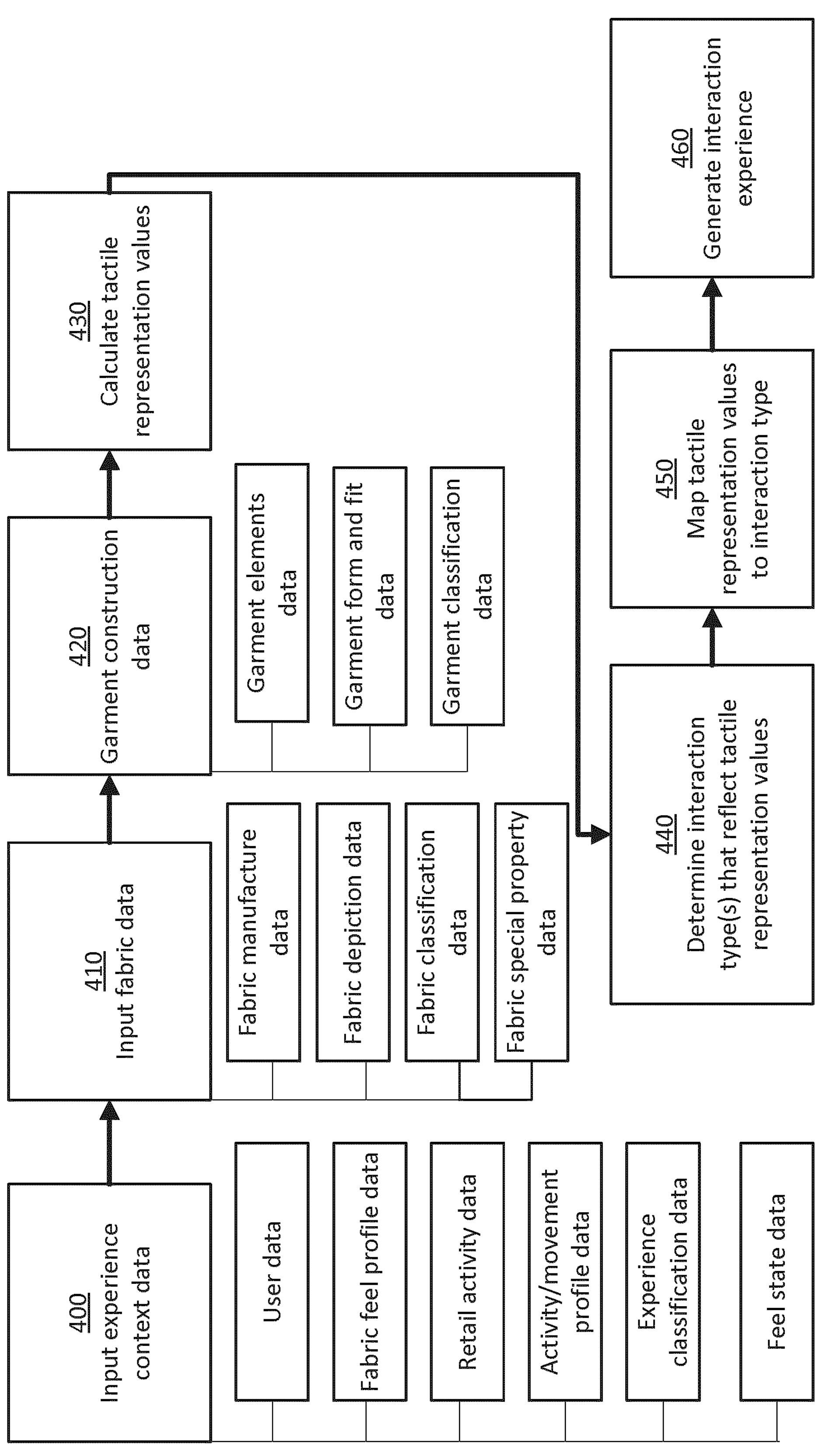
FIG. 5 shows an example method of generating a multisensory digital interaction experience, according to embodiments described herein.

The method is shown generally in FIG. 5 which shows a flow diagram of the steps that may be taken to generate a multisensory digital interaction experience. At 400, the system 100 receives input experience context such as context data that includes metadata sets pertaining to the context of the interaction experience. The contextual data includes data that pertains to the context for interaction experience. For example, in embodiments, this dataset contains data identifying qualities such as specific contextual user data, user classification metadata, fabric feel profile, specific contextual retail activity, categories of retail activity, specific contextual activity/movement profile data, categories of activity/movement profile data, specific contextual multisensory digital interaction experience data, multisensory digital interaction experience metadata, specific feel state data, categories of feel state data, specific wellness data, categories of wellness data, specific contextual mood data, categories of mood data. In one embodiment, fabric feel profile data identifies hero fabrics. In embodiments, a subset of the input experience context data is used. In embodiments, at least one of the input experience context data types is used.

At 410, the system 100 receives or accesses input material or fabric data. For example, fabric data can include data that pertains to the fabric contained in the manufactured garment, in embodiments, fabric data identifies qualities such as fabric manufacture data, fabric depiction data, fabric classification data, fabric special property data, and so on. In one aspect, fabric data provides specific details about the fabric, weave, pattern, color, material blend, and chemical composition. Special fabric properties include proprietary feel values, performance aspects, engineered fabric details, and the like. In some embodiments, identifying qualities associated with a fabric comprises receiving data for more than one fabric within the garment construction, and so on. The material data can also relate to other non-fabric material for apparel construction.

At 410, the system 100 receives or accesses input apparel construction data. The apparel construction data includes data that pertains to the construction of the manufactured item of apparel. For example, in some embodiments, this dataset contains data identifying qualities such as garment elements data, garment form and fit data, garment classification data, garment design based on sizing data, waistline data, band data, strap data, pocket data, loft data, draping data, decorative element data, and so on.

At 430, the system 100 calculates tactile representation values. In some embodiments, the tactile representation values indicate tactile (or touch) qualities or characteristics of a fabric or a material, one or more apparel item, or portions there. For example, the calculated tactile representation values can be a set of numeric values that indicate tactile or touch qualities or characteristics. In one embodiment, the tactile representation values include one or more unstructured data items that indicate tactile or touch qualities or characteristics.

The tactile representation values are calculated based on the input values received or access by the system 100 at 400, 410, 420. In one embodiment, the system 100 calculates tactile representation values based on one of the data inputs, such as garment classification, or feel state data. In one embodiment, the system 100 calculates tactile representation values using a process that does not change based on a data input, although these inputs can impact the computed result. In one embodiment, the calculated tactile representation values result is a set of numeric values. In one embodiment, the tactile representation values include one or more unstructured data item. In some embodiments, a tactile representation value which is associated with a fabric or a material, associated with one or more apparel item, but agnostic of a specific garment construction, may be calculated.

In one embodiment, the inputs provide a numerical representation of material or fabric qualities including all or a subset of fabric category, fabric color, fabric type, fabric feel, fabric weight, and fabric coatings for each of the fabric elements within the garment as well as garment measurements, garment fit metrics, garment category, garment feel, garment color combinations. These numeric values are then used to calculate a composite value representing tactile qualities of the garment or other item of apparel.

In one embodiment, one of the inputs used to calculate the tactile representation values is video, and/or a series of images, of the garment undergoing predetermined interactions and one of the output values relates to this visual input. In one embodiment, one of the inputs used to calculate the tactile representation values is audio of the garment undergoing predetermined interactions and one of the output values relates to this audio. In one embodiment, at 440, the system 100 determines interaction types that reflect tactile representation values using a model of interaction types 70 to determine the type of interaction that best represents the tactile representation values. Certain interaction types better reflect certain material and apparel constructions, and not all interaction types apply to a given material or apparel construction. For example, stretching a waistband would not apply to a garment construction that did not include a waistband. Specific fabrics qualities, such as stretchability can be better represented by specific interaction types. In addition, certain activity/movement profile gestures are better exemplified by one interaction type rather than another interaction type. In one embodiment, one interaction type is determined as a match. In some embodiments, more than one interaction type is determined as a match.

The system 100 uses interaction type model(s) 70 to determine one or more interaction types that reflect or match tactile representation values. That is, the system 100 uses interaction type model(s) 70 to determine the type of interaction that best represents the tactile representation values. The interaction type model 70 can be based on garment design, and fabric type, for example, and the system 100 can use the interaction type model(s) 70 to determine the interaction type based on the on apparel design, and material or fabric type. In one embodiment, the interaction type model 70 is a trained model. In one embodiment, the interaction type model 70 is updated through machine learning. For example, the system 100 can receive feedback data regarding interaction types, length of interaction, or purchase events, and the system 100 can use the feedback data to update the interaction type model 70 using machine learning. In another example, the system 100 can use machine learning based on contextual data and metadata to update the interaction type model 70. In some embodiments, interaction type model 70 includes interaction types associated with one or more specific fabric and/or fabric type, agnostic of garment construction, which may be provided.

For example, experience shows that certain types of fabric movement and response matter more to a user when evaluating a garment's suitability for a specific activity. For example, when evaluating a legging garment, stretching the fabric and feeling the smoothness of the fabric on the body may be effective interaction types. When evaluating a jacket type garment, interacting with thickness and loft through pinching the fabric and seeing the fabric response and simulating a surface response to water exposure may be more effective.

Certain types of fabric have responsive movement that is rated as enjoyable by users and this responsive movement may best be depicted within a specific multisensory digital interaction experience type. Factors that the tactile representation value may represent, such as activity, intended feel state, garment type, fabric qualities, garment construction details can contribute to evaluating which interaction types are a best match. At 450, the system 100 maps the tactile representation values to an interaction type. In one embodiment, the tactile representation values provide data for generating multiple colors, sizes designs, or versions of a product (e.g. item of apparel). In one embodiment, an interaction type selectively applies a subset of tactile representation values.

At 460, the system 100 generates the interaction experience. In one embodiment, the interaction generator 60 applies the interaction type model 70 to the tactile representation values to generate the multisensory digital interaction experience. In one embodiment, the method of generating the multisensory digital interaction experience depends on the type of the interaction experience. In one embodiment, metadata concerning the generated interaction experience is associated with multisensory digital interaction experience that is generated.

In aspects of embodiments of embodiments, these interaction experiences, are generated as executable code instruction modules, interactive media files, interactive applications, and/or applets.

In an example of one embodiment, the process represented in FIG. 5 comprises receiving input experience context data 400 that includes user search history, user retail activity purchase history, user activity preferences, fabric feel profile data concerning categories of fabric and the suitability of material for various activities, activity movement profile data includes information about general correspondences between activity and apparel preferences as well as specific customer preferences related to the activity movement profiles associated with their preferred activity. Further experience classification data categorizes the interactions which tend to be perceived as exciting, relaxing, or motivating, feel state data is associated both with types of fabric and elements of apparel design that are associated with a achieving a specific feel state. It should be appreciated that calculate tactile representation values can be calculated with a subset of the potential experience context data.

For the purposes of this example, a user Lisa Smith has been searching for leggings, has purchased a size 6 pink high support bra and a size 8 red hooded sweater in the past six months, her activity profile indicates she prefers running and cycling, in the past Lisa Smith has indicated a preference for smooth silky feeling fabrics, data shows certain material or fabric types and apparel types are better suited to running and cycling activities, her fitness activity shows she has been attending yoga classes daily and running long distances on a regular basis, and we have data that certain garments are regularly selected by other users who have a similar activity profile. Experience context data includes metadata concerning which interactions tend to evoke a specific feel state for customers. Metadata from Lisa's profile preferences and search strategy is classified and indicates a preference for excitement and apparel and materials that let her feel free.

Input fabric data 410 includes fabric data associated with the fabric, detail, and/or fastener elements within a garment or other item of apparel. This includes data about the weight, manufacture, and fabric classification of the fabric elements within the garment as well as any special property data associated with the garment. In this example, the garment is primarily made from Luxtreme which has qualities such as slickness, low-friction surface, sweat-wicking, four-way stretch, breathability, feels cool to the touch, and added Lycra® fibre for stretch and shape retention. These qualities are represented by numerical value that represent their degree of presence in the fabric. Other manufacture data, thickness, and special qualities such as the reflective surface detailing are represented in the input fabric data. In addition to the numerical data, other image, video and audio files are supplied as data related to the fabric.

The garment construction data includes data that represents the garment, and apparel construction data includes data that represents the item of apparel. In this example, of the Swift Speed Legging it includes patterns in multiple sizes, data concerning elements such as the side drop-in pockets and zippered back pocket, and draw-cord placement. As well, Garment construction data may include classification data that includes the activity or activities for which the garment is designed.

The input experience context data 400 is combined with fabric data 410 and garment construction data 420 to calculate tactile representation values 430. It should be appreciated that the data elements within each of these categories of input data and the specific data within these categories can be weighted using a number of formula types.

The tactile representation values are then used to determine the interaction type(s) that reflect the tactile representation values 440. In this example, a model is used to evaluate potential interaction experience types matches. Based on the tactile representation values, some interaction types are evaluated as not being applicable to the tactile representation values. In this example where the tactile representation values have been calculated based on Lisa Smith and general experience context data, Luxtreme™ fabric, and a Swift Speed Legging garment construction some interaction types such as adjusting a shoulder strap or fastening a button are not available as they are not part of the garment design and are not reflected in the tactile representation values. Other interaction types are lower matches and although theoretically the interaction type could be generated based on the tactile representation values (representing the garment and fabric qualities) these interaction types represent properties that are not meaningful features based on the tactile representation values. In the example of the Luxtreme fabric Swift Speed Legging it would be possible to generate interaction type to depict pinching the loft of the garment fabric or interacting with the fabric water resistance but these do not represent key features of the fabric or garment. After eliminating interaction types that are not applicable or that focus on features that are not well represented by the tactile representation values, there are still a number of potential interaction type experiences to evaluate. In this example, the formula has been designed to prioritize the user's preference for excitement, a key quality of the fabric, and a distinctive feature of the garment design. A fabric stretching and springing back interaction type is matched with the user preference for excitement and the distinctive fabric qualities, a hand feel interaction is matched as preferred way to experience Luxtreme fabric and also highlights the garment design with no inseam, and the draw-cord feature is a popular garment design feature and the pulling the draw-cord interaction type is also rated as a more exciting interaction type. Other interaction types such as scrunching the fabric, feeling the flow of the garment on a hanger, opening the zipper pocket, and such are lower ranked. In this embodiment, interaction types which best reflect prioritized aspects from each of the fabric, garment construction, and experience context input data are evaluated to be better matches. In one embodiment of this embodiment, additional visual or audio elements, such as activity based background videos or images and music, and are added to the interaction type that is recommended based on user input experience context data.

This is an illustrative example, and system 100 can involve other items of apparel and different materials for constructing the items of apparel, including non-fabric materials.

In another embodiment, the input context data 400 is a navigational context in an online retail 40 and context data that classifies experiences and user preferences related to these experiences 400. The user data may include data concerning the users preferred multisensory digital interaction experience type, the user device's 10 technical capacity for multisensory digital interaction experience type, or preferred mood, duration, or feel state associated with the multisensory digital interaction experience type. In this example the user device 10 is a smart mirror equipped with a video camera and a touchscreen. The fabric data 410 provides information about the fabrics within the garment including classifying the fabric and its weight, detailed images of the fabric surface, and audio of the fabric in motion. In this example the fabric is Nulu which is categorized as soft, sweat wicking, with Lycra for stretch and shape, breathable, four-way stretch. A single numerical value is used to represent the specific combination of key fabric properties. The garment construction data 420 contains data related to the garment, in this example Align leggings garment pattern, garment classification based on activity, garment classification based on colors, and garment form and fit data. Garment construction is represented through numerical data and video data. Calculate tactile representation values results in a set of data that includes structured data and images, video, and audio. In one embodiment of this embodiment, determine interaction type(s) that reflect tactile representation 440 eliminates interaction types that are not applicable or that focus on features that are not well represented by the tactile representation values, and then prioritizes interaction types that have a dependency on the technical capacities of user device 10. In this example, interaction types such as augmented reality grasping, stretching, pinching, and manipulation of garment in different simulated environmental conditions, that leverage the smart mirror video and touch screen are rated as best matches.

In one embodiment, input experience context data 400 includes experience classification data concerning experience types and does not include data specific to a user or navigational context. This experience context data 400 is combined with input fabric data 410 and input garment construction data 420 to calculate the tactile representation values 430. The data inputs 400, 410, 420, to calculate the tactile representation values 430, and to determine interaction types that reflect tactile representation values of FIG. 5 and in embodiment examples are exemplary in nature, and the range of data provided, the order of the steps may be changed. Data elements and steps may be omitted and/or added without departing from the scope of the disclosure.

Figure 6:
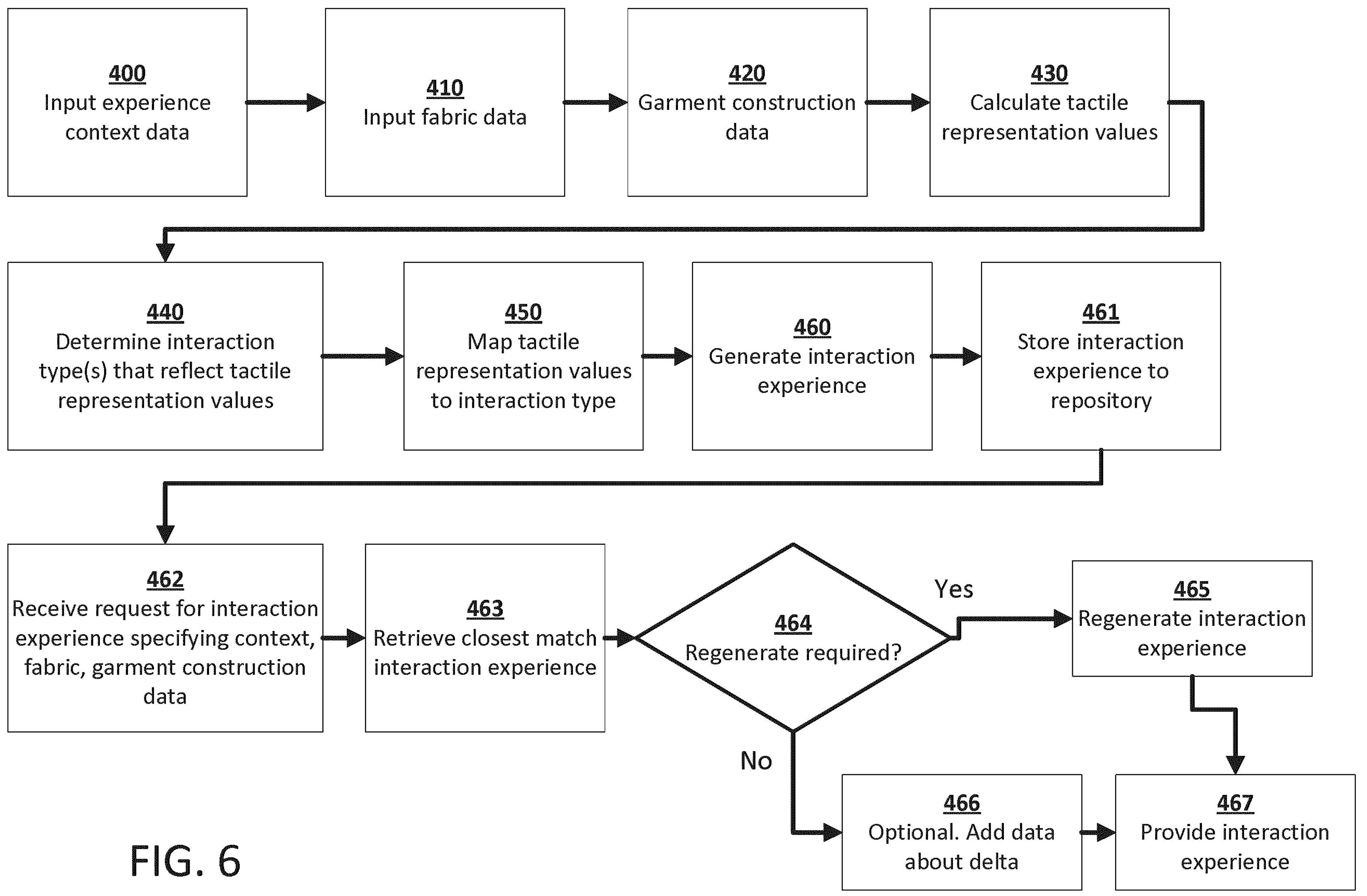
FIG. 6 shows an example method of generating a multisensory digital interaction experience, according to embodiments described herein.

The method shown generally in FIG. 6 expands on the process flow of FIG. 5. See FIG. 5 for further detail of operations at 400, 410, 420, 430, 440, 460. The steps shown in FIG. 6 are exemplary in nature, and the order of the steps may be changed, and steps may be omitted and/or added without departing from the scope of the disclosure.

At 461, the system 100 stores the interactive experience to data storage device or repository. In one embodiment, the system 100 stores the generated interaction experience to interaction repository 80. In one embodiment, the system 100 stores the interaction experience to database 30. In one embodiment, retail 40 contains the interaction repository 80.

At 462, the system 100 receives a request for interaction experience specifying context, material or fabric, apparel construction data, and so on. In some embodiments, the query specifies different data to be used to retrieve the closest match. For example, in one embodiment, a product key may be provided within the data when requesting an interaction experience.

At 463, the system 100 retrieves matching interaction experience to provide an interaction experience that most closely matches or fully matches the request represented in 462. In one embodiment, a single match is provided by the system 100. In one embodiment, multiple matches are provided by the system 100. In one embodiment, additional match criterion are specified in addition to the query data values.

At 464, the system 100 determines the regeneration required. In one embodiment, this process evaluates the closest matching interaction experience against the requested interaction experience, and applies defined logic to determine whether to regenerate the interaction experience. At 465, the system 100 regenerates the interaction experience. In one embodiment, the system 100 fully regenerates the interaction experience from its tactile representation values. In one embodiment, at 465, the system 100 implements partial regeneration of an interaction experience which is used to update certain qualities in a interaction experience. In one embodiment, an interaction experience for a garment is not regenerated for the same garment with the same fabric in a different color. In one embodiment, a partial regeneration is performed by the system 100 at 465.

At 466, the system 100 can add or capture data about the difference between the requested interaction experience and the closest match interaction experience, or the delta. For example, in one embodiment when the fabric color in the request is different, an indicator may display so that the user knows the interaction experience is for the right product but the interaction hasn't been generated for the color that they were looking at. Alternatively, the user could be shown an indicator that they are being presented with another product, in the same product category, (e.g. leggings) because they have requested an experience with a product for which there is no interaction experience available. For example, in one embodiment when the fabric color in the request is different, an indicator may display so that the user knows the interaction experience is for the right product but the interaction hasn't been generated for the color that they were looking at. Alternatively, the user could be shown an indicator that they are being presented with another product, in the same product category, (say leggings) because they have requested an experience with a product for which there is no interaction experience available. In one embodiment, the method adds metadata to the interaction experience. In one embodiment, this metadata is used by the system 100 to flag the interaction experience for maintenance and/or update. In one embodiment, at 466, the system 100 adds a text or graphic indicator to the interaction experience that indicates if the interaction experience does not fully match the criteria requested.

FIGS. 7-12 and 16-20 illustrate examples of aspects of embodiments of an interface (e.g. interface 14 of user device 10) for the multisensory digital interaction experience 700 that uses multisensory digital interaction experience system 100 to provide interaction experiences to a user. Example interaction experiences include tactile interaction experiences that simulate physical touch. In some embodiments, Retail 40 displays the multisensory digital interaction experience 700. In other embodiments, application 18 displays the multisensory digital interaction experience 700. In other embodiments, the multisensory digital interaction experience 700, is an independent executable code application.

Figure 7:
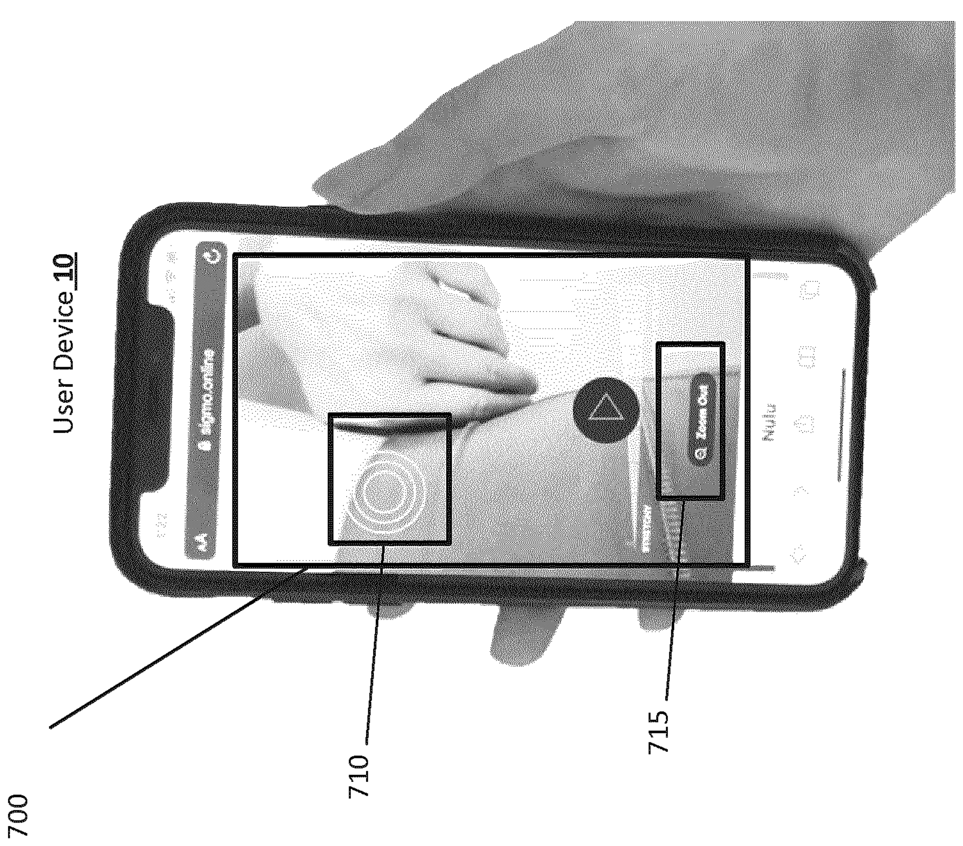
FIG. 7 shows an example user interface with a multisensory digital interaction experience.

FIG. 7 provides an example of a multisensory digital interaction experience 700 wherein interactive element 710 provides the user a tactile control to experience stretching the waistband of a legging as an example embodiment. For example, the interactive element 710 receives tactile input data to update the interface to visually indicate the stretching the waistband of a legging. The stretch function shows a visual depiction of the waistband's elasticity and resistance as the user, through their tactile gesture received by the interactive element 710, stretches the waistband. In this example, the user can view a visual depiction of the garment at the interface as they interact with it using the interactive element 710. Additional user controls 715 to modify the interaction experience, select an alternate interaction experience, or change a factor the interaction experience may be provided. In this example, user control 715 enables the user to change the zoom factor. In some embodiments, additional audio and haptic feedback is provided as part of the sensory digital interaction experience.

Figure 8:
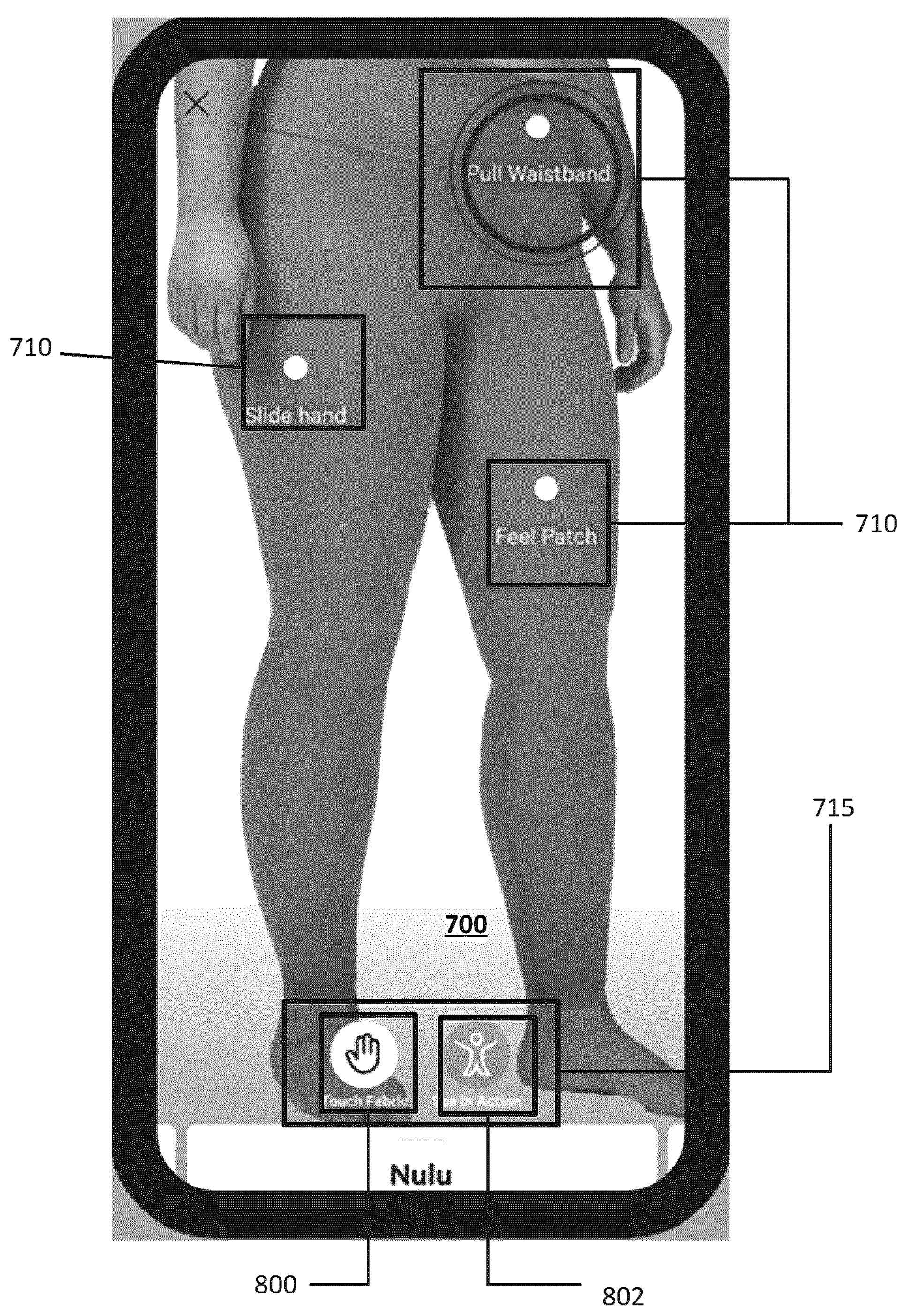
FIG. 8 shows another example user interface with a multisensory digital interaction experience.

FIG. 8 illustrates an example of the multisensory digital interaction experience 700 wherein multiple multisensory digital interaction experiences 700 are provided. In this example, provided for the purposes of illustration, the user can select interactive element options such as slide hand 710, pull waistband 710, and feel patch 710 which are each associated with a specific (and different) multisensory digital interaction experience types and are also combined in multisensory digital interaction experience 700. That is, the different interactive element options such as slide hand 710, pull waistband 710, and feel patch 710 can be used to control and trigger different multisensory digital interaction experience types. In this example, the user is provided with a set of digital interaction experiences associated with touch fabric 800 and is provided with a user control see in action 802 from the set of user controls 715 to access another set of interaction experiences.

Figure 9:
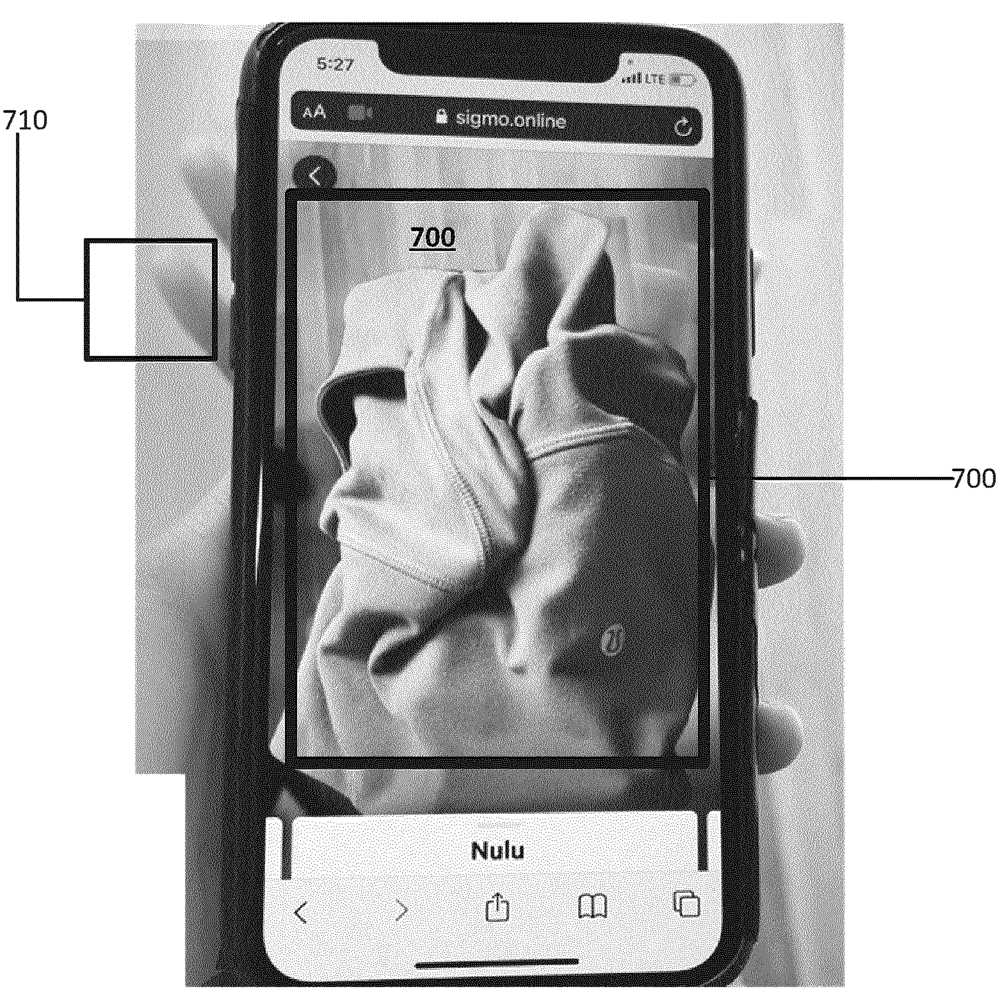
FIG. 9 shows another example user interface with a multisensory digital interaction experience.

FIG. 9 illustrates an example of the multisensory digital interaction experience 700. The multisensory digital interaction experience 700 uses the user device 10 video camera to engage with the interactive element 710 and the user's hand, as captured as image data by the video camera, is depicted interacting with a representation of the garment in multisensory digital interaction experience 700. This example is an illustration of simulating grasping a digitally simulated garment and using an augmented reality technology to simulate physical or in-person (e.g. physical presence) interaction with a manufactured garment.

Figure 10:
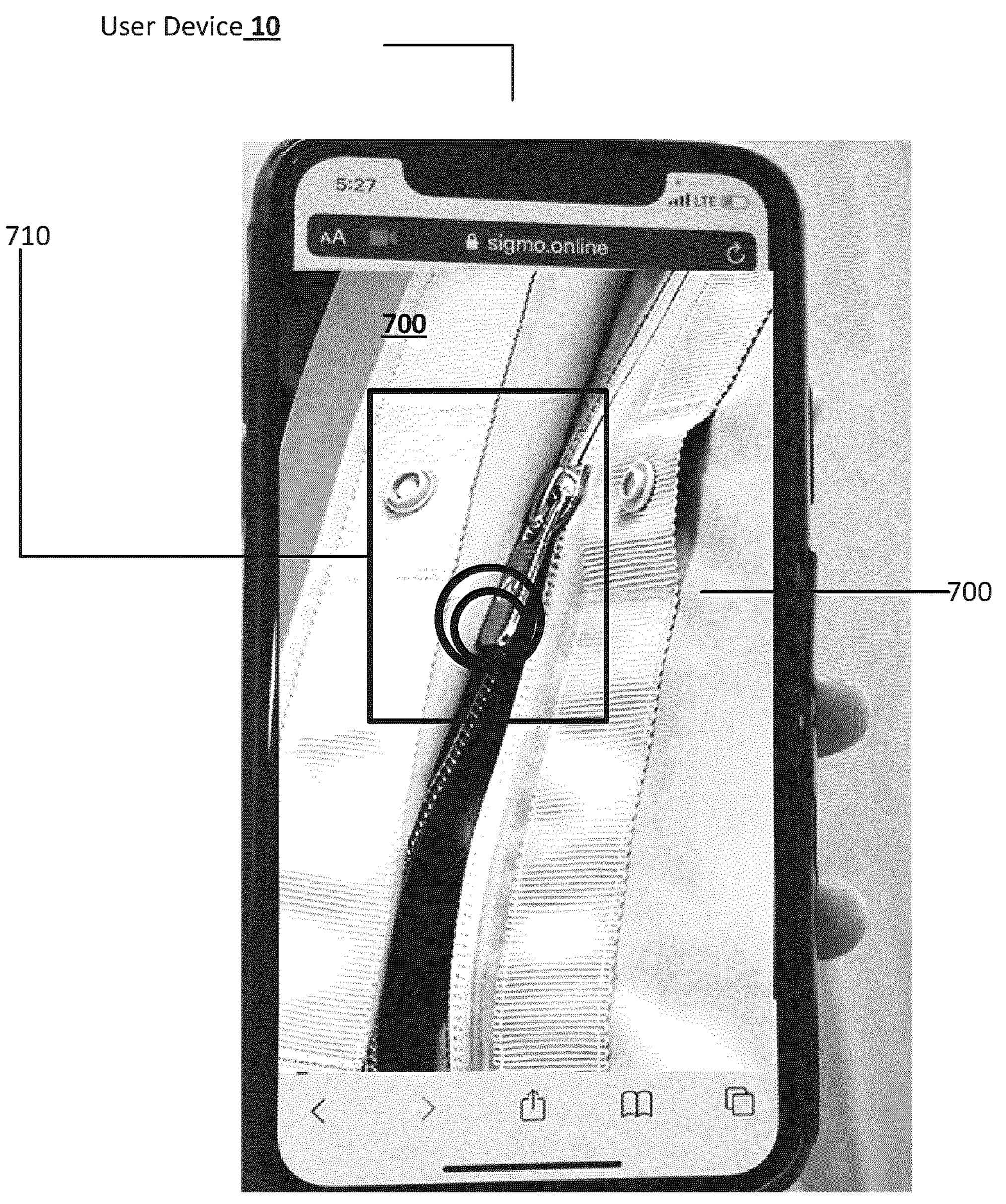
FIG. 10 shows another example user interface with a multisensory digital interaction experience.

FIG. 10 illustrates an example of the multisensory digital interaction experience 700. For example, the interactive element 710 receives tactile input data to update the interface to visually indicate the stretching the pulling of a zipper fastener. This interaction type is only applicable to a garment or item of apparel with this zipper type design element. The suitability of a multisensory digital interaction experience to represent a garment may factor a number of properties that are depicted in the tactile representation value. Examples of design elements interactions that can be depicted by a multisensory digital interaction experience 700 pulling, adjusting, buttoning, snapping, or opening such apparel design elements as waistbands, drawstrings, zippers, fasteners, and adjustable straps. In addition to garment design elements, multisensory digital interaction experience 700 can depict and allow engagement with simulated digital depictions of the special qualities of the material and or/apparel design such as breathability, waterproofness, water resistance, water channeling, compression, fabric knit patterns, fabric coatings, seams, bonding, color change based on light angle, color change responsiveness to environment or body temperature/moisture/movement, and garment response to heating or cooling.

Figure 11:
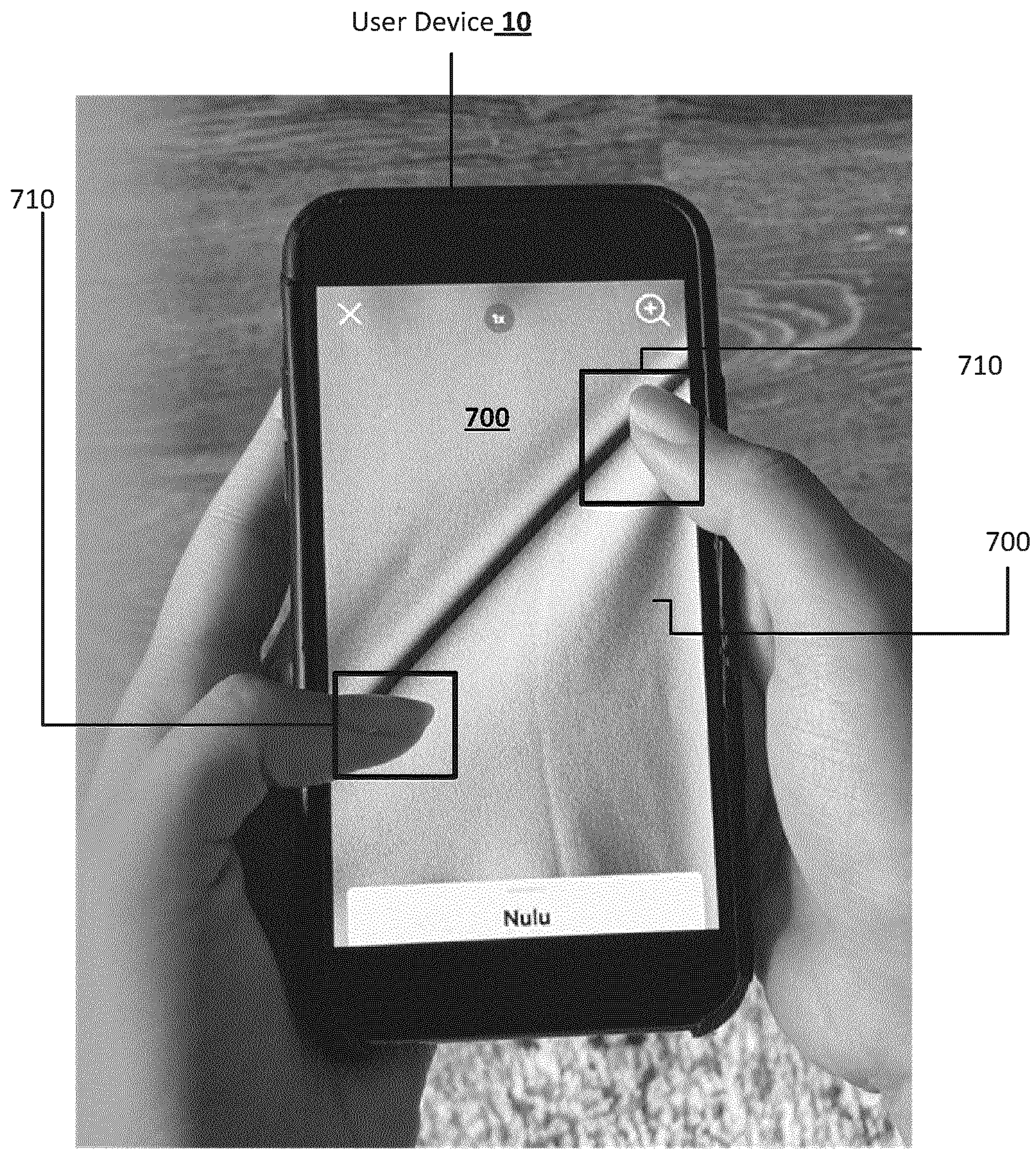
FIG. 11 shows another example user interface with a multisensory digital interaction experience.

FIG. 11 illustrates an example of the multisensory digital interaction experience 700. For example, the interactive element moving garment fabric on body 710 receives tactile input data from any portion of the visual indication of the fabric to update the interface to visually indicate the movement of the fabric. The user can make pinching and other gestures using more than one finger to interact with the digitally simulated fabric.

Figure 12:
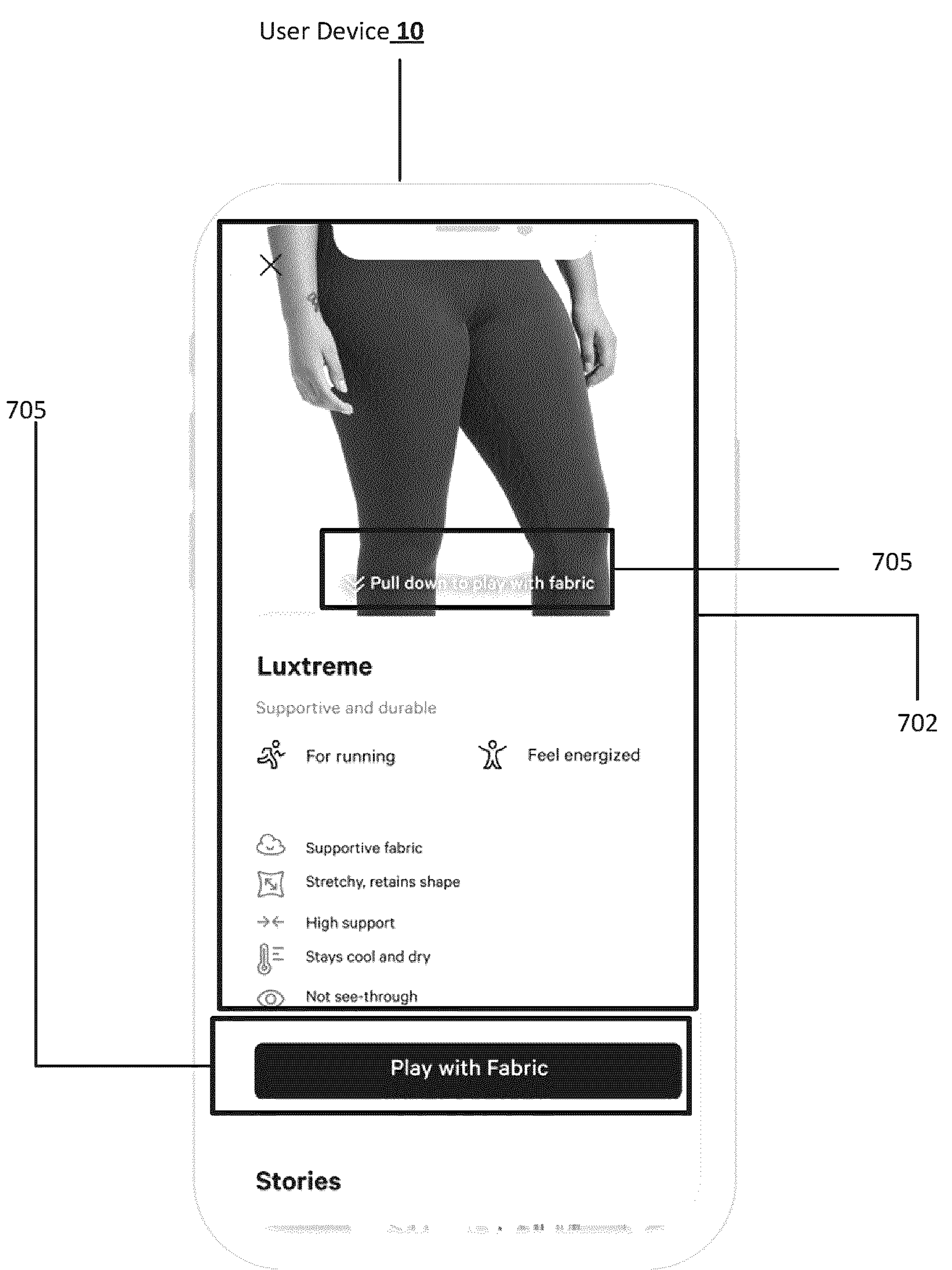
FIG. 12 shows a example user interface with a retail context providing the context for a multisensory digital interaction experience.

FIG. 12 illustrates an example of the multisensory digital interaction experience context in a retail product page 702. In this example, selecting a play with fabric element 705 displays the multisensory digital interaction experience 700 related to this product.

Figure 13:
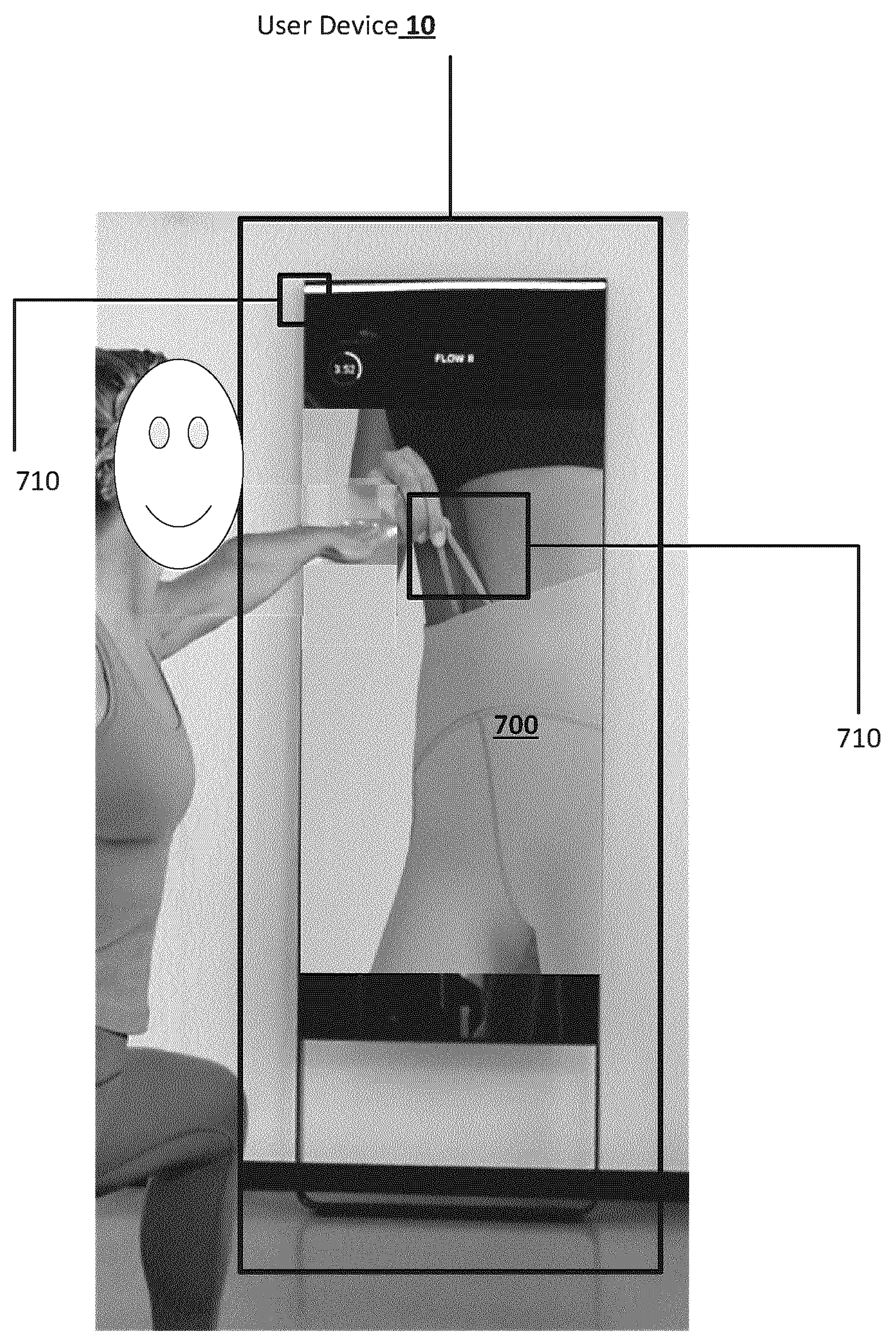
FIG. 13 shows another example user interface with a multisensory digital interaction experience.

FIG. 13 illustrates an example of the multisensory digital interaction experience 700. For example, the user device 10 is a smart mirror device. The multisensory digital interaction experience 700 uses the smart mirror user device 10 video camera to engage with the interactive element 710 and the user's hand, as captured as image data by the video camera, is depicted interacting with a representation of the garment in multisensory digital interaction experience 700. The user can make pinching, pulling, and other gestures using the video capture of their hand interacting with the digitally simulated garment. In one embodiment, a hand is depicted in the interaction and in one embodiment the hand is not depicted in the interaction. In one embodiment, smart mirror user device 10 comprises a touchscreen and the interactive element 710 is activated and/or interacts with the user touch. In one embodiment, interactive element 710 combines touch and video camera inputs to the multisensory digital interaction experience 700. While in the above-described embodiment the digital processing of the data, the determination of the interaction type, and the generation of the multisensory digital interaction experience have been described as being performed by system 100, in some embodiments operations may be performed by hardware servers 20, and in other embodiments operations may be performed by user device 10, provided that user device 10 has access to the required instructions, techniques, and processing power. In some embodiments, operations may be performed by a combination of hardware servers 20 and user devices 10. Servers 20 can have access to greater processing power and resources than user devices 10, and therefore may be better suited to carrying out operations that involve relatively resourceintensive processing of generating multisensory digital interaction experience. Accordingly, in some embodiments, operations of system 100 can be distributed across hardware servers 20 and user devices 10 to optimize usage of computer resources.

Figure 14:
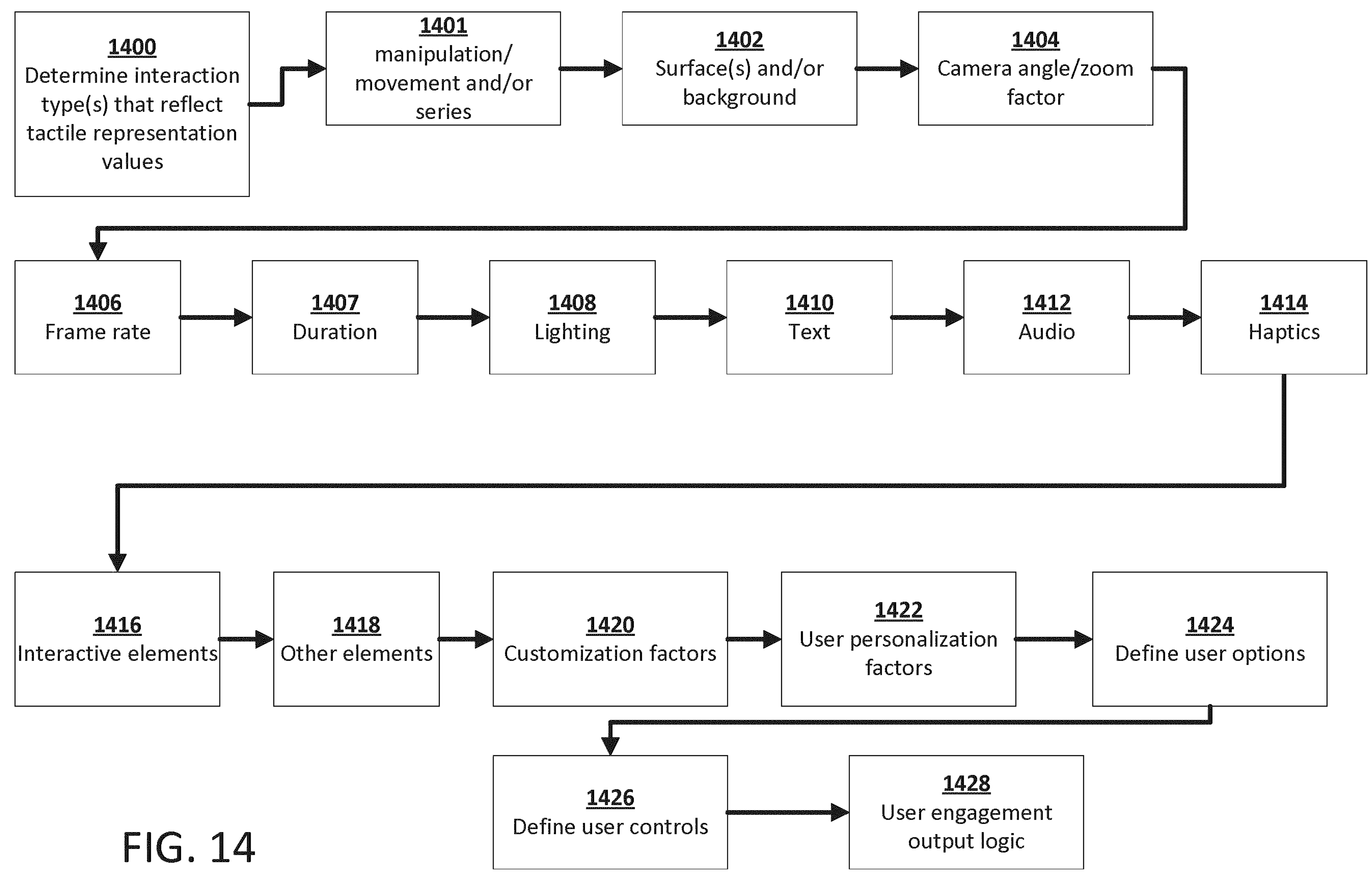
FIG. 14 shows an example method associated with embodiments.

FIG. 14 illustrates an example method associated generating an interaction experience associated with an embodiment. In this example method, various elements of an interactive touch responsive video-based interaction experience are determined. The method is associated with and/or triggered by determine interaction type(s) that reflect tactile representation values 1400. Determining includes evaluating one or more interaction type to generate one or more customizations, and/or one or more regenerations based on the tactile representation values. In some embodiments, the determination leads to the system generating, customizing, and/or regenerating. In some embodiments, instructions for settings and content elements related to manually generating, customizing, and/or regenerating the interaction experience, in some embodiments in conjunction with the system processes, result from the method.

For the purposes of this example, the interaction type determined comprises a responsive visual video type aspect and FIG. 14 illustrates considerations in generating such an interaction type. Depending on the tactile representation value an interaction type may be designed to highlight, and or feature, specific apparel, or fabric and/or material characteristics, properties, or features. For example, if the apparel item is a waterproof rain jacket the interaction type may be designed to demonstrate the garment, or fabric, water resistance and/or hydrophobic qualities. In some embodiments, content depicted within an interaction experience is generated by inputting specific depictions of a physical object, in some embodiments by digitally simulating specific depictions of a physical object, and in some embodiments by combining specific depictions of a physical object and digital simulations of specific depictions of a physical object. In some embodiments, tactile representation values are associated with a category and this category has one or more predetermined preferred aspect related to an interaction experience.

In some embodiments a color or fabric pattern is simulated but other aspects are based on inputting specific depictions of a physical object. In some embodiments, the specific depictions of a physical object are generated using one or more mechanical device, and in other embodiments they may be recorded using specific settings on a image, video, audio, smell, haptic measurement, other parametric measurement devices and system, 3D scanner, testing, or other recording device. In some embodiments, the specific depictions of the physical object are generated using a simulation system. In some embodiments this system is based on 3D modeling, physics-based modeling, direct modeling, parametric modeling, a combination thereof or the like.

In some embodiments, based on contextual metadata, such as user metadata, purchase, activity, or navigational history indicating a preference, an aspect and/or characteristic of the apparel item and/or fabric/material or other aspect of the interaction experience may be selected or highlighted in such a way that the preferred aspect can be experienced. For example, a camera angle and surface may be selected such that either thickness or thinness is more clearly depicted.

In some embodiments, a manipulation, movement and/or series 1401 of manipulations and/or movements of the item of apparel, fabric, and/or material is used within the interaction experience. In the provided interaction experience, this manipulation, movement, and/or series of manipulations and/or movements may be triggered in response to a user input such as touch input, the use of a control to engage with the interaction experience, and the like.

The surface, combination of surfaces, on body surface, portion of body surface, and/or background 1402 on which the item of apparel, fabric, and/or material is depicted has been shown to affect the user perception when engaged with an interaction experience. For example, a curved surface may be used to better depict the smoothness, draping qualities, or thinness of an item of apparel, fabric, and/or material.

In some embodiments, the camera angle and zoom factor 1404 are determined based on the interaction type and the tactile representation values associated therewith. The perceived distance of the object, depth of field, focal length are factors in conveying aspects of the associated tactile representation values and physical object. In some embodiments, a physical object may be used to generate the interaction experience content and the camera angle and zoom may be based in a physical camera device. In some embodiments, the interaction experience content may be generated using digital simulation and such aspects as camera type, camera angel, and camera zoom may also be digitally simulated.

Frame rate 1406 may be altered when the interaction experience is recorded to support a specific user impression of smoothness, streamlined design, performance qualities of the fabric, material and/or item of apparel. This frame rate for a visual element associated with the interaction experience may be designed to support a specific user output logic 1428 where the frame rate responsiveness to user input is determined.

Duration 1407 includes the duration given to a specific portion of the interaction experience, for example a manipulation, movement and/or series, as well as the overall duration of the interaction experience. In some embodiments, the interaction experience contains a looping element which has a specific determined duration prior to restarting. These durations may be determined based on aspects of the associated tactile representation values, data, and/or metadata.

Lighting 1408 effects perception, and in addition to certain preferred lighting conventions for clear depiction, color accuracy, and standard qualities, some lighting selections effect user impressions of an aspect of the fabric, material, item of apparel, or the larger understanding of an item of apparel. For example, when an item of apparel, as reflected in garment construction data 420, is designed for winter-use, indoor use, night-time use, summer use, specific lighting designs may present the interaction experience with a lighting condition/lighting design that is more resonant for the user and reflects the environmental conditions the user associates with the item of apparel and/or material type.

Text 1410 such as overlays, closed captioning, associated descriptions, labels, and the like may be determined based on the tactile representation values in combination with other data about the material, fabric, and/or item of apparel.

Audio 1412 such as music, sound, soundscape, spoken description, sound of product, sound of the fabric and the like may be determined based on the tactile representation values, data, metadata, or a combination.

Haptics 1414 may include vibration, electro-static feedback, force, and the like embedded within the interaction experience logic. In some embodiments, the interaction experiences are designed to make use technical capacities of one or more output device 17 associated with user device 10. These output device 17 capacities may include such as actuators, including piezoelectric actuators, voice coils, specific screen coatings and/or other elements which provide electrostatic and/or ultra low electrical current output. In some embodiments output device 17 is a virtual reality headset, virtual reality device, virtual reality environment, augmented reality headset, augmented reality device, augmented reality environment or the like. Haptic elements are responsive to user input, such that different forms of user input provide a different haptic response. Specific logic related to haptic accent, space, rhythm and patterns may be used to convey aspects of the tactile representation values. Haptic output and/or patterns may be generated based on algorithms, recorded based on material, fabric, and or item of apparel and specifications associated with the tactile representation values, or a combination. In some embodiments, haptic experiences incorporate haptic illusions.

Interactive elements 1416 are determined in association with the tactile representation values. For example, certain interaction experiences are most applicable to some items of apparel, some types of items of apparel, some forms of apparel construction. In some cases, an interaction experience may not be preferred, and in some cases it may not apply, for example testing a zipper on an item of apparel without a zipper, would not be provided as an interaction experience. Specific controls may be associated with specific types of interaction experience. For example, an interactive control to increase or decrease precipitation would be associated with an interaction experience that provided a simulation of a material, fabric, or garment in such conditions.

Other elements 1418 may be provided based on the tactile representation values, metadata values, or a combination thereof. These other elements may include logos, framing, offers, seasonal features, contextual material, promotional material.

Customization factors 1420 such as language, region, membership, activity, may also be used to determine aspects of the interactive experience. Customization factors may be provided based on the tactile representation values, metadata values, or a combination thereof.

User personalization factors 1422 such as preferences, size, gender, skin color, language, may be used to generate a more resonant interaction experience. User personalization may be provided based on the tactile representation values, metadata values, or a combination thereof.

Define user options 1424 includes determining aspects of the interaction experience that a user is able to alter, select, or specify. Based on the tactile representation values associated with a fabric, material, aspect of an item of apparel, or item of apparel, different options may be provided to the user. For example, with a textured fabric or material, a user option for a greater zoom capacity may be generated. For example, for an item of apparel with a lacing feature a lace and unlace interaction experience type may be generated and the user provided with an option to access that interaction type. Other types of user options include selecting a product, fabric, or material type or feature, selecting a color for a product, fabric, or material, changing a background, changing an interaction type, activity, feature of an interaction type, feature of an activity.

Define user controls 1426 defines the user controls that are available associated with the tactile representation values, metadata, or a combination thereof. In addition to user controls associated with define user options 1424, controls for engaging with the interaction experience are defined. In some interaction experiences controls may be based on gestures, touch, eye movement, voice, and the like or combinations. In some embodiments, one input, for example user touch and/or gesture, holds the simulated object while a second input, such as touch and/or gesture, smooths, stretches, crumples, shakes, or otherwise performs a motion with the fabric and/or item of apparel. In some aspects of embodiments, the user input acts as a proxy for user touch. In some aspects of embodiments the user input acts to change a factor such as temperature, speed, volume of rain, direction of rain, volume of snow, direction of snow, volume of poured water, direction of poured water, speed of wind, direction of wind, direction of motion, speed of motion, shape of motion, type of motion, strength of light, direction of light, strength of UV exposure, direction of UV exposure, and the like. In some aspects of embodiments, the user input acts as a combination of a proxy for user touch and a means of changing a factor.

In some embodiments, user engagement output logic 1428 enables the output logic, For example ratios between the speed at which the user engagement occurs with the speed at which a response occurs, and other smoothing, uneven motion, or jerking techniques. For example, when conveying a smooth thin fabric, the motion within the interaction experience may be faster than when conveying a thicker heavier fabric in response to the same velocity of user input. For example, when conveying a thick soft fabric, the visual indication of deformation (sinking into the fabric) may be greater than with a thin smooth fabric in response to the same pressure within a user input. Similarly, blurring transitions may be used to convey speed or softness, and other transitions may be used to convey resilience, sturdy fabric qualities, and/or springiness. The degree of anticipation may also be a factor in user engagement output logic. In some embodiments, this user engagement output logic is determined based on tactile representation values and/or tactile representation values in combination with other values and/or metadata.

In some embodiments, the apparel item is a shoe, sock, slipper, sandal, flipflop or boot and values associated with the tactile representation value reflect the apparel design and fabric and/or other material composition of the apparel item. In some embodiments, types of multisensory digital interaction experiences include simulating one or more of grasping, stretching, feeling thickness, feeling the flex of the item of apparel, fastening design detail of item of apparel, unfastening design detail of garment, manipulating aspect of apparel material, waterproofness of apparel, waterproofness of fabric, wicking of apparel, moisture absorption of apparel, moisture absorption of fabric, the sound of apparel being manipulated, the sound of apparel striking one or more specific surfaces, the sound of apparel engaged in a specific activity, tilting of garment in light, tilting of fabric in light, manipulation of garment in different simulated environmental conditions, manipulation of material in different simulated environmental conditions, simulation of apparel engaged in specific activity, apparel motion engaged in specific movement of a portion of a body, simulation of apparel stretch engaged in specific movement of a portion of a body, simulation of apparel opacity engaged in specific movement of a portion of a body, movement of water on garment surface, movement of water on fabric surface, movement of snow on apparel surface, movement of snow on fabric surface, directional compliance of a apparel, directional compliance of a material within an apparel item, grip of apparel on a surface, grip of material on a surface, traction of apparel on a surface, traction of material on a surface. In some embodiments, the apparel item is an accessory, for example, or more of a workout mat, exercise support, block, and/or cushion, exercise slider, exercise strap, belt, sunglasses, backpack, wristlet, bag, case, towel, glove, armband, mitten, sock, hair scrunchy, clip, headband, tie, mask, wristband, ear warmer, neck warmer, arm warmer, leg warmer, hijab, water bottle, scarf, hat, or the like.

Figure 15:
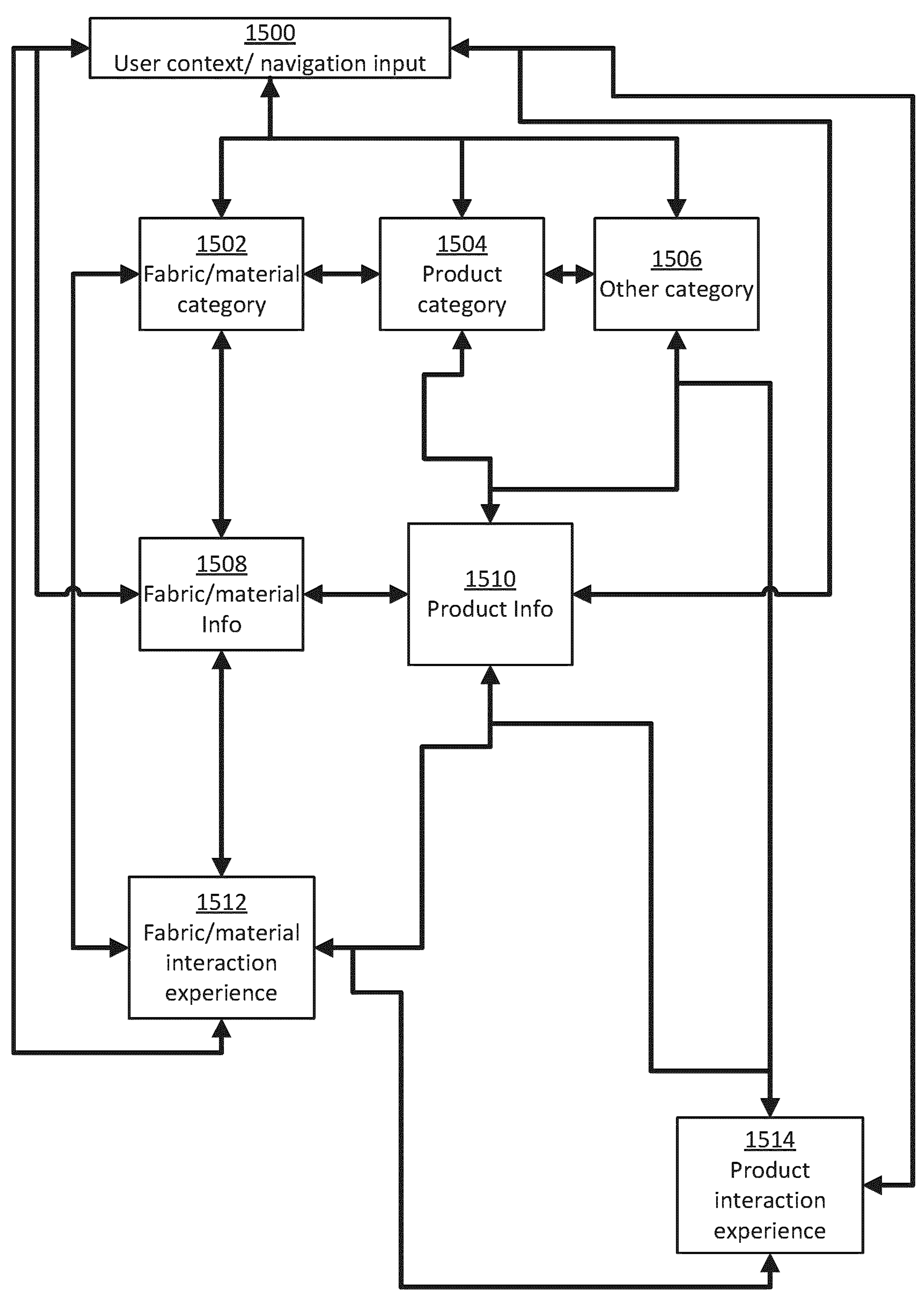
FIG. 15 shows an example method associated with embodiments.

FIG. 15 illustrates an example method associated providing an interaction experience associated with an embodiment. When a user engages with an application, online retail, educational experience, exercise class, coaching session, gamified experience, or the like, providing a multisensory digital interaction experience may vary the user's experience, engage a user's attention, assist in product selection, assist in fabric and/or material selection, assist in product feature selection, increase the user's sense of relationship and/or ownership of a product, increase the user's probability of making a purchase, increase the user's confidence in the function of an item of apparel, increase the user's confidence in the function of a fabric and/or material, and the like. Given the range of effects that providing one or more multisensory digital interaction experiences may have, there are many navigational contexts in which providing an interaction experience may improve the user's experience. Interaction experiences may require longer user engagement durations, greater data and/or network usage, greater hardware processing than more static content and this may affect the optimal frequency and placement of interaction experiences within a user engagement. As will be appreciated, this flow is an exemplary simplification and interaction experiences may be integrated into user experience flows with different types of content and at any number of points.

Category and information elements in this example may be combined in a single element, and interaction experiences embedded in any of these elements. For example, a single element for a jacket category, may highlight a particular jacket product, provide information about jacket categories, and include a comparison fabric interaction experience for fabrics associated with the most popular jacket products.

The example in FIG. 15 receives a user context/navigational input 1500 which may include a user ID, a search term, a user selection, a system ID, a regional context, navigational history, purchase history, and other metadata. Based on the user context/navigation input 1500 one or a combination of fabric/material category 1502 information, product category 1504 information, or other category 1506, such as activity, color, season, sales, promotions, size, theme, fabric/material info 1508, product info 1510, fabric interaction experience 1512, and/or product interaction experience 1514 may be provided. In some embodiments the navigation direction is from category element 1502 1504 1506 to info element 1508 1510. In some embodiments, a combination of more then one of fabric/material category 1502, product category 1504, other category 1506, fabric info page 1508, product info page 1510, fabric interaction experience 1512, and product interaction experience may be provided at the same time. In some user navigational flows, the user may engage with an interaction experience associated with a fabric or material type to determine with which products and/or product interactions to engage. In some embodiments, haptic data is associated with a fabric and/or material type.

In some embodiments, user context/navigation input 1500 provides a Need for Touch (NFT) measurement. This measurement may be associated with a user profile, region, activity, group or the like. This measurement may be based on an assessment, historical navigational patterns, historical purchase history and the like for a user or a group of users. Depending on the NFT measurement, more or fewer interaction experiences may be provided to a user or cohort and the display of those interaction experiences may be more or less dominant within a user interface.

Figure 16:
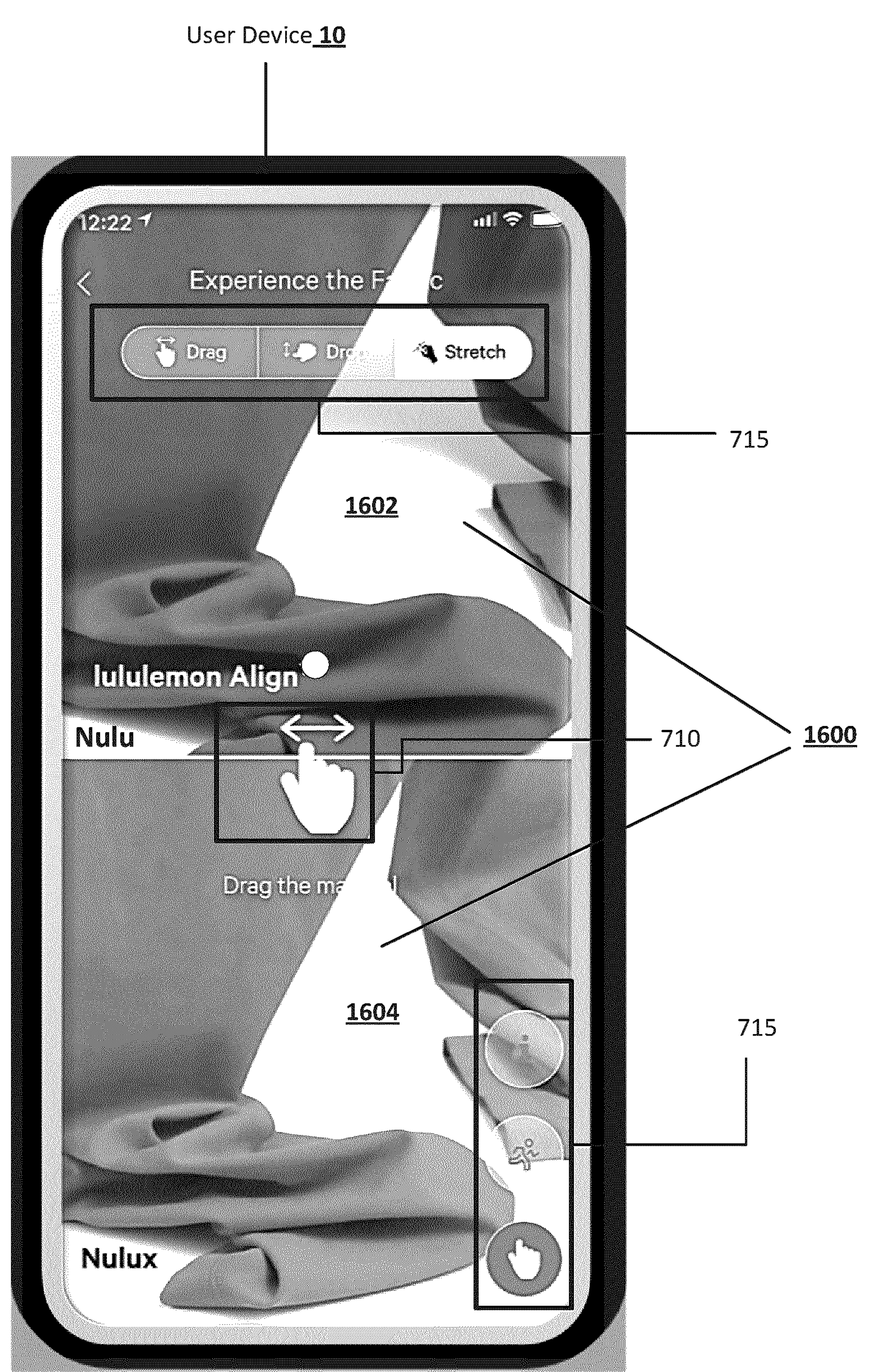
FIG. 16 shows an example user interface associated with embodiments.

FIG. 16 shows an example user interface associated with embodiments. This user interface 1600 on user device 10 presents a multisensory digital interaction experience which facilitates the user experiencing two or more fabrics, materials and/or two or more items of apparel through a single experience. In this example, the upper portion 1602 of the interaction experience user interface 1600 depicts the Align legging in Nulu fabric and the lower portion 1604 depicts the Align legging in Nulux fabric. This type of interaction experience facilitates the user making comparisons between different items of apparel and determining preferences. User controls 715 provide access additional interaction types, associated information, and options. In this example, interactive element 710 receives a touch, gesture, and/or other input from the user of the interaction experience which enables the user to interact with both fabric types.

Many garments are offered with a similar or the same style and/or design but with different fabric options. In this example, the user is able to interact with the Align legging in both the Nulu and Nulux fabric and make comparisons by moving the two types of fabric. In some embodiments, the fabrics both are simultaneously or near simultaneously depicted as responding to the same interactive element 710 user input to the interaction experience 1600. In some embodiments, a user interacts with two fabric and/or material interaction experiences and based on the that interaction experience is able to select items of apparel made from, or with the fabric material, as a component.

Figure 17:
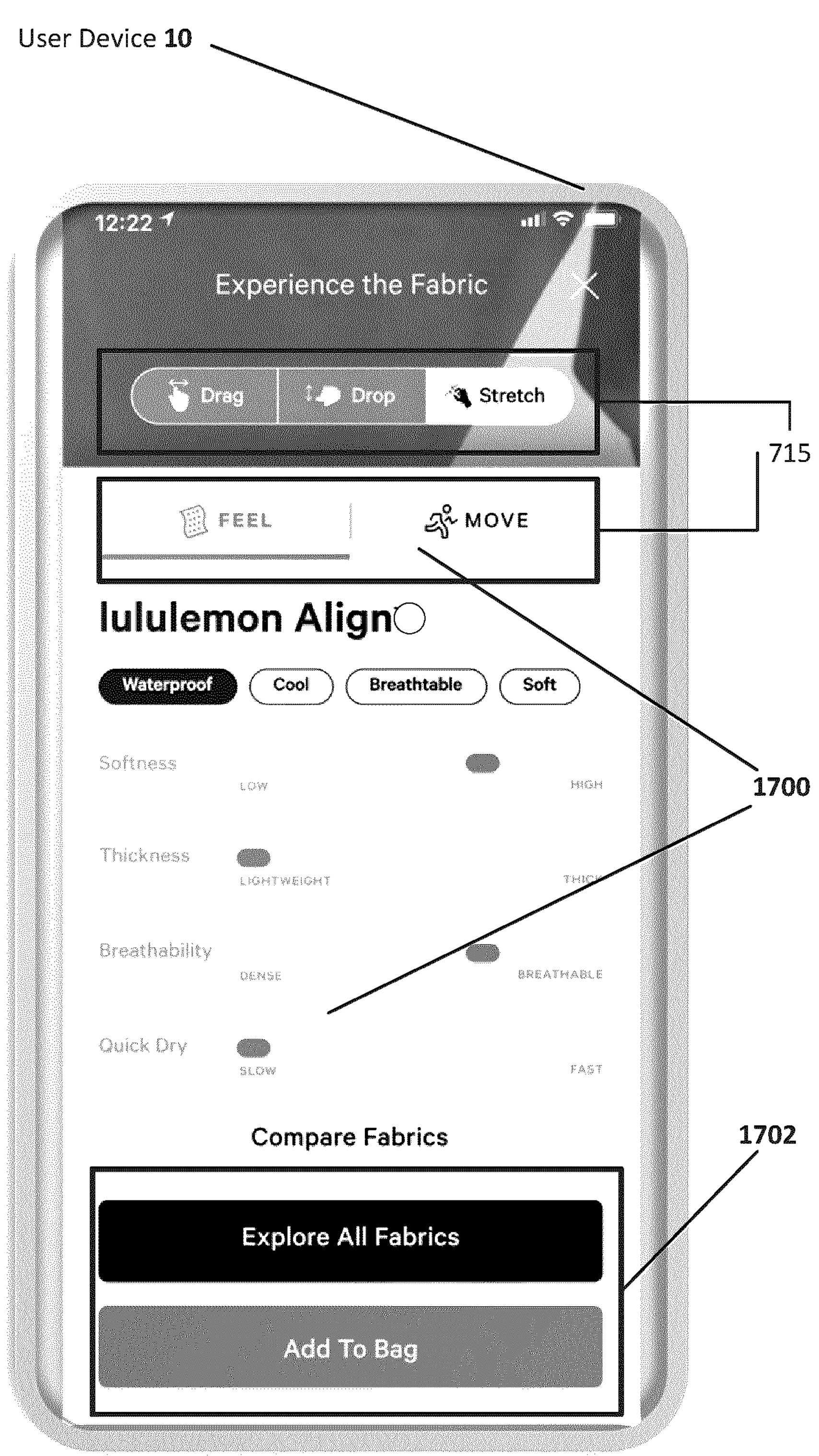
FIG. 17 shows an example user interface associated with embodiments.

FIG. 17 shows an example user interface associated with embodiments. This user interface 1700 on user device 10 presents a material and/or fabric information page which provides user controls and links to multisensory digital interaction experiences 715 as well as general navigation 1702 associated with a material and/or fabric.

Figure 18:
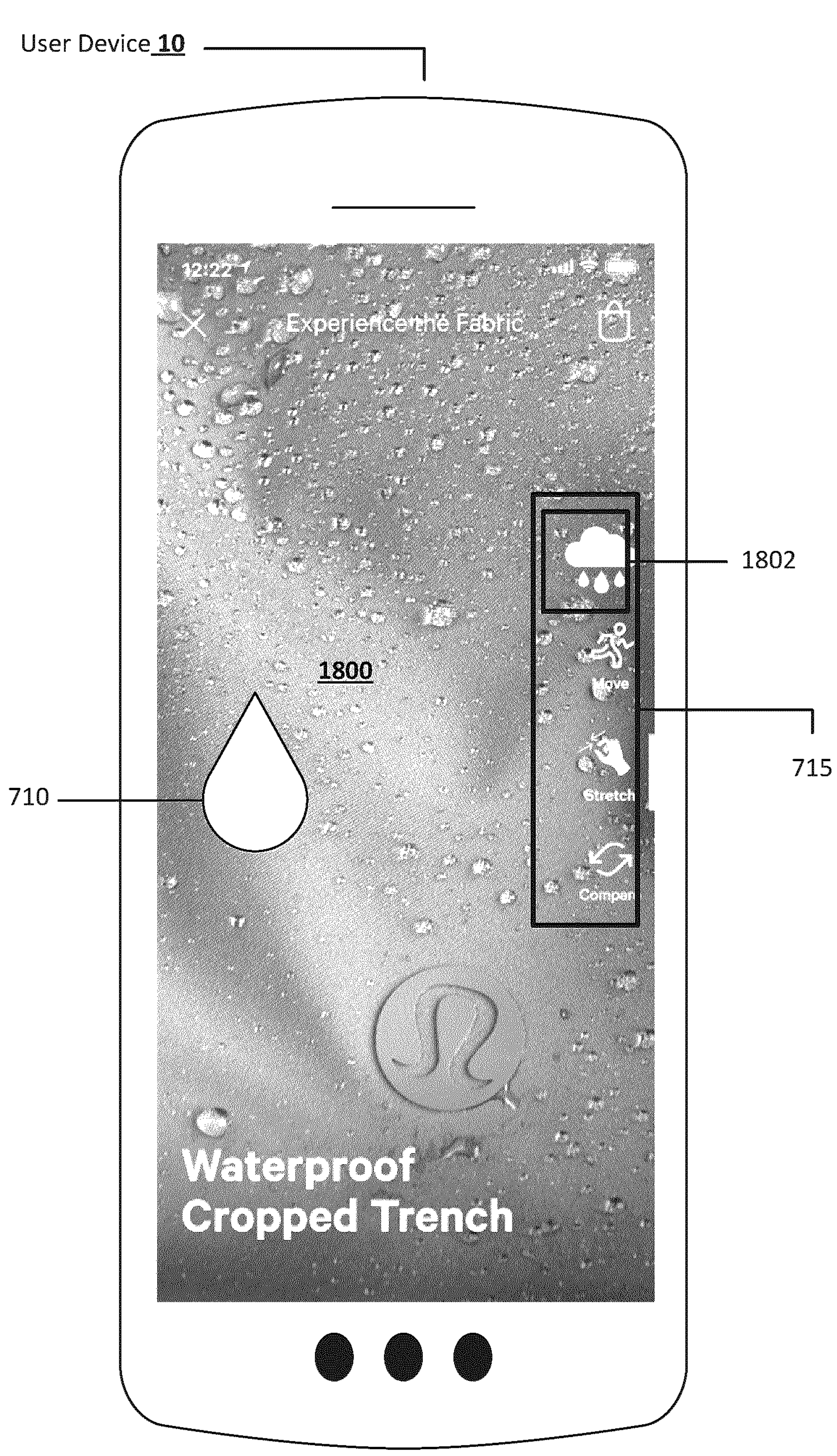
FIG. 18 shows an example user interface associated with embodiments.

FIG. 18 shows an example user interface associated with embodiments. This user interface on user device 10 presents an interaction experience 1800 associated with the Waterproof Cropped Trench apparel item. User control 1802 for the rain interaction experience within the set of user controls 715 provides an interaction experience where the user is able to perceive the how the item of apparel responds to increased amounts of rain on various portions of the surface when the user engages with interactive element 710. Similar interaction experiences may be generated and/or customized for other environmental contexts such as sweating, snow fall, wind, temperature, UV, darkness, lighting types and conditions, and like are provided in some embodiments. In some embodiments, after an environmental context has been established, the user may then stretch, move or manipulate the fabric, material, and/or item of apparel to understand its behavior under those conditions.

Figure 19:
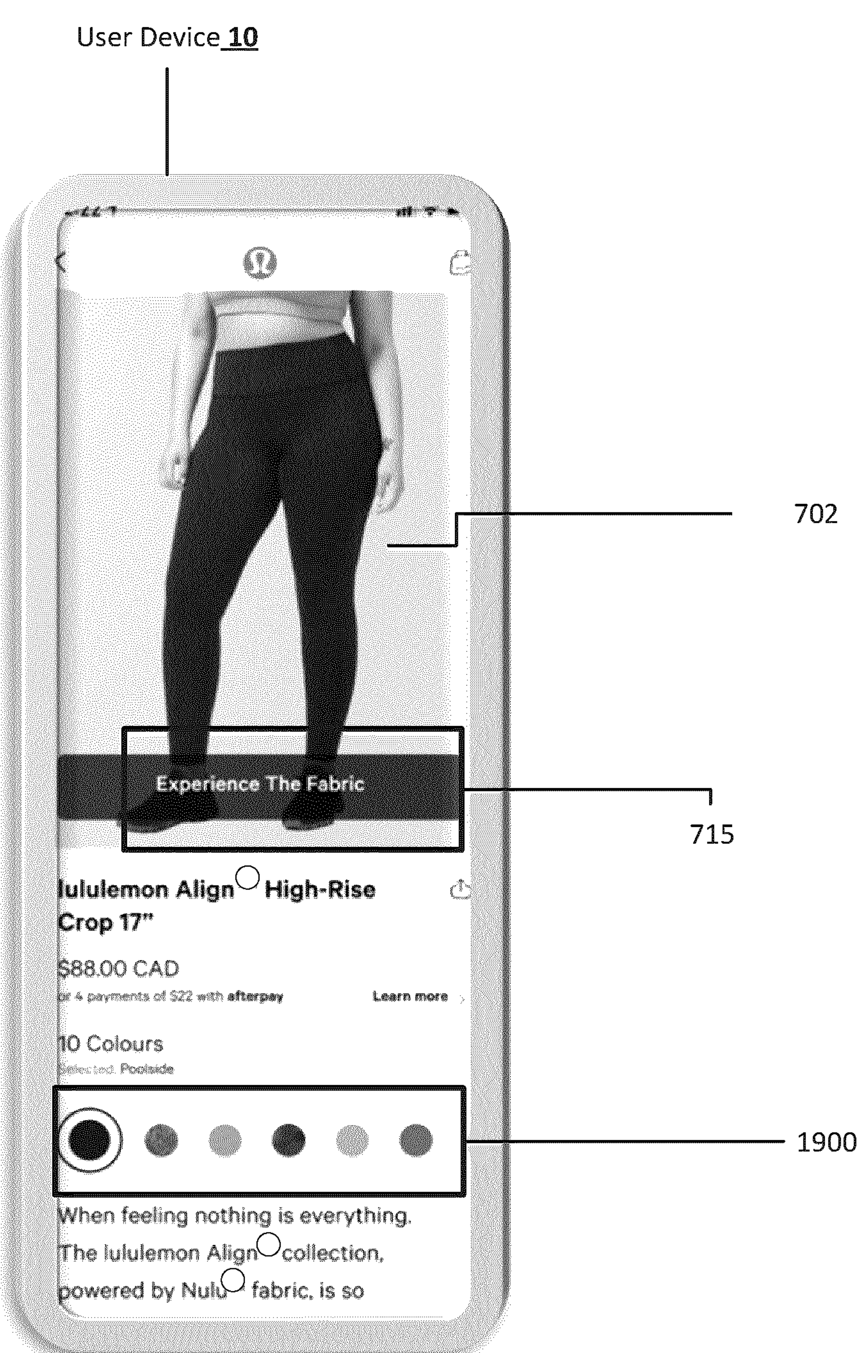
FIG. 19 shows an example user interface associated with embodiments.

FIG. 19 shows an example user interface associated with embodiments. This user interface on user device 10 presents a product information page 702 with an experience the fabric user control 715 to open one or more associated interaction experience. In some embodiments, when the user selects a fabric, color, type, or pattern using the selection control 1900 that user selection is applied to the interaction experience such that the user is able to interact with a simulation of the fabric, material, and/or item of apparel that matches their selection. In some embodiments, the user can select a different color or pattern within the interaction experience itself.

In some embodiments, the default product color to display in the product interaction is based on one or more of user preference, general customer preference, a promotion, activity associated with the color, mood or feel state associated with the color, a fabric texture quality associated with the color, a fabric draping quality associated with the color, a fabric breathability quality associated with the color, increased visibility of a garment element associated with the color, increased visibility of a logo associated with the color, and the like.

Figure 20:
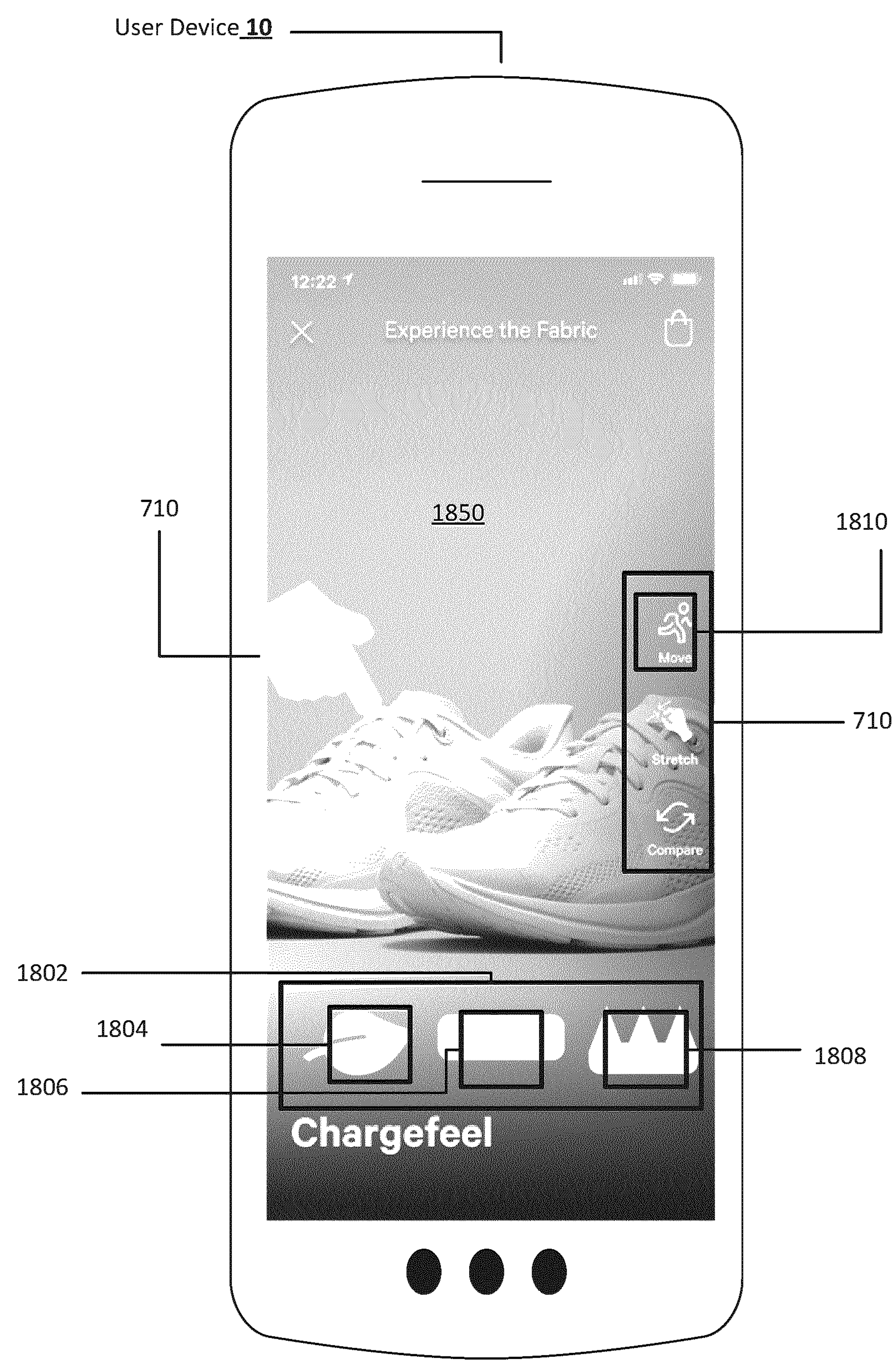
FIG. 20 shows an example user interface associated with embodiments.

FIG. 20 shows an example user interface associated with embodiments. This user interface on user device 10 presents an interaction experience 1850 associated with the Chargefeel running and training shoe. By selecting the Move 1810 interaction type, the user is able to experience interacting with the shoe while it is performing expected body movements. The user engages with interactive element 710 to stretch the fabric, test the springiness of the sole, lace or unlace the shoe, and the like. In some embodiments, the user is able to select a movement type such as walking, running, sprinting, weightlifting. In some embodiments, the user is able to specify specific characteristics associated with the movement type, such as a running pace. In some embodiments, the user is able to select a surface for the movement using controls 1802. In this example, the interaction experience can be modified to experience the movement on grass and/or nature trail surface 1804, a flat paved surface 1806, and/or an uneven surface 1808. In some embodiments, the user is able to select specific surface types within a category, in some embodiments a surface is provided by default.

The word “a” or “an” when used in conjunction with the term “comprising” or “including” in the claims and/or the specification may mean “one”, but it is also consistent with the meaning of “one or more”, “at least one”, and “one or more than one” unless the content clearly dictates otherwise. Similarly, the word “another” may mean at least a second or more unless the content clearly dictates otherwise.

The terms “coupled”, “coupling” or “connected” as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context. The term “and/or” herein when used in association with a list of items means any one or more of the items comprising that list.

As used herein, a reference to “about” or “approximately” a number or to being “substantially” equal to a number means being within +/−10% of that number.

The technical solution of embodiments may be in the form of a software product. The software product may be stored in a non-volatile or non-transitory storage medium. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

While the disclosure has been described in connection with specific embodiments, it is to be understood that the disclosure is not limited to these embodiments, and that alterations, modifications, and variations of these embodiments may be carried out by the skilled person without departing from the scope of the disclosure.

It is furthermore contemplated that any part of any aspect or embodiment discussed in this specification can be implemented or combined with any part of any other aspect or embodiment discussed in this specification.

The invention claimed is:

1. A system for providing user access to a multisensory digital interaction experience to simulate physical interaction with manufactured apparel comprising:

a user device having an interface to provide the multisensory digital interaction experience, wherein the user device connects to one or more output devices that provide sensory output that electronically simulates physical interaction with a manufactured item of apparel;

a hardware processor programmed with executable instructions for generating the multisensory digital interaction experience, wherein the hardware processor:

receives input data comprising contextual experience data, material data, apparel construction data;

calculates tactile representation values using the input data;

determines an interaction type to generate based on the tactile representation values and at least one trained interaction type model;

generates the multisensory digital interaction experience using the interaction type;

a non-transitory memory storing the at least one trained interaction type model, and data records defining the contextual experience data, the material data, and the apparel construction data, wherein the trained interaction type model is updated using machine learning;

wherein the user device connects with one or more input devices for capturing data defining interaction with the multisensory digital interaction experience to manipulate or control one or more aspects of the multisensory digital interaction experience, wherein the user device has network capacity for transmitting the data defining the interaction with the multisensory digital interaction experience, and device capacity metadata.

2. The system of claim 1 wherein the interaction experience type of the multisensory digital interaction experience comprises simulating at least one of grasping, scrunching, stretching, feeling thickness, smoothing, feeling apparel movement on hanger, feeling material movement on the hanger, feeling apparel movement on flat surface, feeling material movement on the flat surface, feeling apparel movement on body, feeling material movement on the body, opacity of apparel on the hanger, opacity of material on the hanger, opacity of the apparel on flat surface, opacity of the material on flat surface, opacity of the apparel on body, opacity of the material on body, resilience of the apparel, resilience of fabric, manipulating design detail of the apparel, tightening design detail of the apparel, loosening design detail of the apparel, fastening design detail of the apparel, unfastening design detail of the apparel, manipulating aspect of the material, waterproofness of the apparel, waterproofness of material, wicking of the apparel, wicking of the fabric, moisture absorption of the apparel, moisture absorption of the material, the sound of the apparel being manipulated, the sound of the material being manipulated, the sound of apparel movement on body, the sound of material movement on body, the sound of the apparel engaged in a specific activity, the sound of the material engaged in the specific activity, folding of the apparel, folding of the material, unfolding of the apparel, unfolding of the fabric, feeling apparel movement on curved surface, feeling material movement on a curved surface, opacity of the apparel on the curved surface, opacity of the material on the curved surface, scrunching, tilting of the apparel in light, tilting of the material in light, manipulation of the apparel in different simulated environmental conditions, manipulation of the material in different simulated environmental conditions, simulation of the apparel engaged in the specific activity, simulation of the material engaged in the specific activity, simulation of apparel motion engaged in specific movement of a portion of a body, simulation of apparel stretch engaged in the specific movement of a portion of the body, simulation of apparel opacity engaged in the specific movement of a portion of the body, smell of the apparel, smell of the material, movement of water on the apparel surface, movement of water on the material surface, movement of snow on the apparel surface, movement of snow on the material surface, movement of wind on the apparel surface, movement of wind on the material surface, simulating directional compliance of the apparel, simulating directional compliance of the material, grip of the apparel on a surface, grip of the material on a surface, traction of the apparel on the surface, traction of material on the surface, simulating UV exposure of the apparel, simulating UV exposure of the material, simulating transition between lighting conditions of the apparel, simulating transition between lighting conditions of the material, simulating apparel response to moisture, simulating material response to the moisture, simulating apparel response to temperature, simulating material response to the temperature, simulating warming of the apparel on the skin, simulating warming of the apparel on portions of the body, simulating warming of the apparel when engaged in a specific activity, simulating warming of the material on the skin, simulating warming of the material on the portions of the body, simulating warming of the material when engaged in the specific activity, simulating cooling of the apparel on the skin, simulating cooling of the apparel on the portions of the body, simulating cooling of the apparel when engaged in the specific activity, simulating cooling of the material on the skin, simulating cooling of the material on portions of the body, simulating cooling of the material when engaged in the specific activity.

3. The system of claim 1 wherein the multisensory digital interaction experience comprises the use of augmented reality to integrate one or more of a body part of the user and an environment of the user within the multisensory digital interaction experience.

4. The system of claim 1 wherein the wherein the manufactured item of apparel is at least one of a legging, shirt, bra, footwear, jacket, outerwear, swimwear, bag, accessory, pant, under garment, sweater, shorts, joggers, and sleepwear.

5. The system of claim 1 wherein the hardware processor is programmed with the executable instructions to evaluate the input data using a pre-trained model stored in the non-transitory memory.

6. The system of claim 1 further comprising a data storage device with a repository of previously generated multisensory digital interaction experiences, wherein the hardware processor generates the multisensory digital interaction experience using the repository.

7. The system of 1 wherein the hardware processor is programmed with the executable instructions to evaluate previously generated multisensory digital interaction experiences against one or more of the context data, material data, apparel construction data, device capacity data, the tactile representation values, user preferences, the device capacity metadata and determine whether to regenerate, customize, or augment the multisensory digital interaction experience.

8. The system of claim 1 wherein the user device further comprises one or more of a haptic glove, a haptic item of apparel, augmented reality glasses, virtual reality headsets, a video camera, a display screen, a smart mirror, and an immersive hardware device.

9. The system of claim 1 wherein the input data comprises structured data, unstructured data, metadata, text, numeric values, images, renderings based on the images, video, audio, sensor data.

10. The system of claim 1 wherein the contextual experience data comprises one or more data and metadata related to one or more of specific contextual user data, user classification metadata, time, date, location, fabric feel profile, specific contextual retail activity, categories of retail activity, specific contextual activity profile data, specific contextual movement profile data, categories of activity profile data, categories of movement profile data, specific contextual multisensory digital interaction experience data, multisensory digital interaction experience metadata, specific feel state data, categories of feel state data, specific wellness data, categories of wellness data, specific contextual mood data, categories of mood data, user biometric data, categories of the user biometric data, user wishlist, categories of user wishlists, user purchase history, categories of purchase history, navigational history, categories of the navigational history, universal health scores based on user activity, and categories of the universal health scores.

11. The system of claim 1 wherein the material data comprises one or more of material manufacture data, material depiction data, material classification data, material special property data, and data for more than one material within the apparel construction.

12. The system of claim 1 wherein the apparel construction data comprises one or more of apparel elements data, apparel form and fit data, apparel classification data, apparel design based on sizing data, waistline data, band data, strap data, pocket data, loft data, draping data, decorative element data, apparel layer data, apparel pattern data, transformative element data, extender data, fastener data, apparel compression data, apparel venting data, apparel seam data, apparel bonding data, apparel coating data, apparel manufacturing process data, apparel air flow data.

13. The system of claim 1 wherein the hardware processor programmed with executable instructions: updates the multisensory digital interaction experience by one or more of fully regenerating the multisensory digital interaction experience, partially regenerating the multisensory digital interaction experience, adding data to the multisensory digital interaction experience; uses an aspect of one or more of the context data, the material data, the apparel data, to identify a specific aspect of the multisensory digital interaction experience to update when partially regenerating the multisensory digital interaction experience; and evaluates the device capacity to provide the multisensory digital interaction experience, applies the capacity of the user device as a criterion to evaluate one or more of the regenerating the multisensory digital interaction experience, the partially regenerating the multisensory digital interaction experience, the adding data to the multisensory digital interaction experience.

14. The system of claim 13 wherein the hardware processor programmed with executable instructions evaluates user preference metadata as a criterion for one or more of the regenerating the multisensory digital interaction experience, the partially regenerating the multisensory digital interaction experience, the adding data to the multisensory digital interaction experience.

15. The system of claim 1 wherein the multisensory digital interaction experience involves one or more physiological senses, wherein the one or more physiological senses comprise touch, sight, sound, smell, and taste.

16. The system of claim 1 wherein the hardware processor programmed with executable instructions generates the multisensory digital interaction experience as a material based digital interaction experience that involves simulating touch of the material.

17. The system of claim 16 wherein the hardware processor programmed with executable instructions generates the material based digital interaction experience independent of construction of an item of apparel.

18. The system of claim 16 wherein the hardware processor programmed with executable instructions generates the material based digital interaction experience for an item of apparel with different types of materials for the item of apparel.

* * * * *